(12) United States Patent
Cao et al.

(10) Patent No.: US 11,887,311 B2
(45) Date of Patent: Jan. 30, 2024

(54) METHOD AND APPARATUS FOR SEGMENTING A MEDICAL IMAGE, AND STORAGE MEDIUM

(71) Applicant: TENCENT TECHNOLOGY (SHENZHEN) COMPANY LIMITED, Shenzhen (CN)

(72) Inventors: Shilei Cao, Shenzhen (CN); Renzhen Wang, Shenzhen (CN); Kai Ma, Shenzhen (CN); Yefeng Zheng, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 350 days.

(21) Appl. No.: 17/388,249

(22) Filed: Jul. 29, 2021

(65) Prior Publication Data

US 2021/0365717 A1    Nov. 25, 2021

Related U.S. Application Data

(63) Continuation of application No. PCT/CN2020/081660, filed on Mar. 27, 2020.

(30) Foreign Application Priority Data

Apr. 22, 2019   (CN) .......................... 201910322783.8

(51) Int. Cl.
*G06K 9/00*    (2022.01)
*G06T 7/11*    (2017.01)
(Continued)

(52) U.S. Cl.
CPC .............. *G06T 7/11* (2017.01); *G06F 18/253* (2023.01); *G06N 3/08* (2013.01); *G06T 7/0012* (2013.01);
(Continued)

(58) Field of Classification Search
CPC ....... G06F 18/253; G06N 3/08; G06T 7/0012; G06T 7/194; G06T 2207/20081; G06T 2207/20112
See application file for complete search history.

(56) References Cited

U.S. PATENT DOCUMENTS 8,750,585 B2 * 6/2014 Liu ........................... G06T 7/11
128/923
9,968,257 B1 * 5/2018 Burt ...................... A61B 5/0035
(Continued)

FOREIGN PATENT DOCUMENTS

CN    108447052         8/2018
CN    109377496 A   *   2/2019   ............... G06N 3/08
(Continued)

OTHER PUBLICATIONS

Evaluation of a segmentation procedure to delineate organs for use in construction of a radiation therapy planning atlas, Sharif M. Qatarneh et al., Elsevier, 2002, pp. 39-55 (Year: 2002).*
(Continued)

*Primary Examiner* — Jayesh A Patel
(74) *Attorney, Agent, or Firm* — Crowell & Moring LLP

(57) ABSTRACT

Embodiments of this disclosure include a method and an apparatus for segmenting a medical image. The method may include obtaining a slice pair comprising two slices and performing feature extraction on each slice in the slice pair, to obtain high-level feature information and low-level feature information of the each slice in the slice pair. The method may further include segmenting a target object in the each slice according to the low-level feature information and the high-level feature information of the slice, to obtain an initial segmentation result of the each slice and fusing the low-level feature information and the high-level feature information of the slices to obtain a fused feature information. The method may further include determining correla- (Continued)

tion information between the slices according to the fused feature information and generating a segmentation result of the slice pair based on the correlation information and the initial segmentation results of the slices.

19 Claims, 10 Drawing Sheets

(51) Int. Cl.
    *G06T 7/194*     (2017.01)
    *G06N 3/08*     (2023.01)
    *G06T 7/00*     (2017.01)
    *G06F 18/25*     (2023.01)
    *G06V 10/80*     (2022.01)
    *G06V 10/82*     (2022.01)
    *G06V 10/42*     (2022.01)
    *G06V 10/44*     (2022.01)

(52) U.S. Cl.
    CPC .............. *G06T 7/194* (2017.01); *G06V 10/42* (2022.01); *G06V 10/44* (2022.01); *G06V 10/811* (2022.01); *G06V 10/82* (2022.01); *G06T 2207/20081* (2013.01); *G06T 2207/20112* (2013.01)

(56) References Cited

U.S. PATENT DOCUMENTS

| | | | | |
|---|---|---|---|---|
| 2005/0111714 | A1* | 5/2005 | Shen ................... | A61B 6/5294 382/128 |
| 2005/0232474 | A1* | 10/2005 | Wei ..................... | G06T 7/0012 382/128 |
| 2006/0159342 | A1* | 7/2006 | Sun ..................... | G06T 7/174 382/173 |
| 2008/0317342 | A1* | 12/2008 | Fenchel ................ | G06T 7/11 382/173 |
| 2009/0034684 | A1* | 2/2009 | Bernard ................ | G06T 19/00 378/98 |
| 2018/0070905 | A1* | 3/2018 | El-Baz .................. | G06T 7/149 |
| 2018/0240235 | A1* | 8/2018 | Mazo .................... | G06T 7/11 |
| 2019/0130575 | A1* | 5/2019 | Chen .................... | G06N 3/045 |
| 2019/0156144 | A1* | 5/2019 | Li ....................... | G06F 18/253 |
| 2019/0347522 | A1* | 11/2019 | Nir ...................... | G06F 18/00 |
| 2019/0385299 | A1* | 12/2019 | Song .................... | G06T 11/008 |
| 2020/0380675 | A1* | 12/2020 | Golden ................. | G06T 7/143 |

FOREIGN PATENT DOCUMENTS

| | | | |
|---|---|---|---|
| CN | 109427052 | | 3/2019 |
| CN | 109598732 | | 4/2019 |
| CN | 110110617 | | 8/2019 |
| CN | 113506310 | | 3/2022 |
| DE | 102015217948 | A1 * | 3/2017 |
| EP | 2498222 | A2 * | 9/2012 ............... G06T 7/12 |
| JP | 2005-245830 | | 9/2005 |
| JP | 2009-219655 | | 10/2009 |
| JP | 2015080720 | A * | 4/2015 ........... A61B 5/0033 |
| JP | 2019-504659 | | 2/2019 |
| JP | 2019-045894 | | 3/2019 |
| JP | 2019048152 | A * | 3/2019 ............... A61B 5/02 |
| WO | WO-2013054224 | A1 * | 4/2013 ............. A61B 6/466 |
| WO | WO-2017019833 | A1 * | 2/2017 ......... A61K 47/6901 |
| WO | WO-2017210690 | A1 * | 12/2017 |
| WO | WO 2018/153319 | A1 | 8/2018 |
| WO | WO-2018153319 | A1 * | 8/2018 ........... G06K 9/2054 |
| WO | WO-2018222755 | A1 * | 12/2018 ............. A61B 5/055 |
| WO | WO-2018229490 | A1 * | 12/2018 ........... G06N 3/0454 |

OTHER PUBLICATIONS

A hybrid graph-based approach for right ven103-116tricle segmentation in cardiac MRI by long axis information transition, Mostafa Ghelich Oghli et al., Elsevier, 2018, Pages (Year: 2018).*
H-DenseUNet: Hybrid Densely Connected UNet for Liver and Tumor Segmentation From CT Volumes, Xiaomeng Li et al., IEEE, 2018, pp. 2663-2674 (Year: 2018).*
Multi-Depth Fusion Network for Whole-Heart CT Image Segmentation, Chengqin Ye et al., IEEE, 2019, pp. 23421-23429 (Year: 2019).*
Fusing texture, shape and deep model-learned information at decision level for automated classification of lung nodules on chest CT, Xie Yutong et al., Elsevier, 2018, pp. 102-110 (Year: 2018).*
Segmentation and classification in MRI and US fetal imaging: Recent trends and future prospects, Jordina Torrents-Barrena et al., Elsevier, 2019, pp. 61-88 (Year: 2019).*
Content Based Brain Tunor Retrieval for MR Images Using Transfer Learning, Zar Nawab Khan Swati et al., IEEE, 2019, pp. 17809-17822 (Year: 2019).*
English translation of International Search Report dated Jul. 1, 2020 in International Application No. PCT/CN2020/081660.
Extended European Search Report issued on European application 20793969.5 dated Jul. 4, 2022, 8 pages.
Swati, Zar Nawab Khan et al., "Content-Based Brain Tumor Retrieval for MR Images Using Transfer Learning", IEEEAccess.
Torrents-Barrena, Jordina et al., "Segmentation and classification in MRI and US fetal imaging: Recent trends and future prospects", Medical Image Analysis 51 (2019) 61-88.
Japanese Decision to Grant a Patent dated Oct. 28, 2022 in corresponding Japanese Patent Agglication No. 2021-541593 with English translation.
Shahab Aslani et al., "Multi-branch Convolutional Neural Network for Multiple Sclerosis Lesion Segmentation", [online], Apr. 8, 2019, pp. 1-16, https://arxiv.org/abs/1811.02942.

* cited by examiner

METHOD AND APPARATUS FOR SEGMENTING A MEDICAL IMAGE, AND STORAGE MEDIUM

CROSS-REFERENCE TO RELATED APPLICATIONS

This application is a continuation application of PCT Patent Application No. PCT/CN2020/081660, filed on Mar. 27, 2020, which claims priority to Chinese Patent Application No. 2019103227838, entitled "METHOD AND APPARATUS FOR SEGMENTING MEDICAL IMAGE, ELECTRONIC DEVICE, AND STORAGE MEDIUM" and filed with the China Patent Office on Apr. 22, 2019, wherein the content of each of the above-referenced applications is incorporated herein by reference in its entirety.

FIELD OF THE TECHNOLOGY

This application relates to the field of artificial intelligence (AI) technology, and specifically, to medical image processing technology.

BACKGROUND OF THE DISCLOSURE

With the development of AI, the application of AI in the field of medical care, in particular, in the segmentation of medical images, becomes increasingly wide. For example, for the segmentation of liver, a two-dimensional (2D) convolution neural network for segmenting a liver image slice by slice may be trained in advance. A to-be-segmented three-dimensional (3D) liver image, for example, a computed tomography (CT) image of liver, is then sliced. Slices are respectively imported into the trained 2D convolution neural network for segmentation, to obtain a segmentation result, for example, to obtain a liver region, or the like.

However, the foregoing 2D convolution neural network needs to slice a 3D medical image before performing slice-by-slice segmentation, and correlation between spectral bands during a scan is ignored. Therefore, it is very difficult to accurately capture shape information of a target object (for example, liver), resulting in relatively low segmentation accuracy.

SUMMARY

Embodiments of this disclosure provide a method and an apparatus for segmenting a medical image and a storage medium, to improve the accuracy of segmentation.

An embodiment of this disclosure provides a method for segmenting a medical image, performed by an electronic device. The method may include obtaining a slice pair comprising two slices from a medical image and performing feature extraction on each slice in the slice pair using different receptive fields, to obtain high-level feature information and low-level feature information of the each slice in the slice pair. The method may further include segmenting a target object in each slice in the slice pair according to the low-level feature information and the high-level feature information of the each slice, to obtain an initial segmentation result of the each slice and fusing the low-level feature information and the high-level feature information of the slices in the slice pair to obtain a fused feature information. The method may further include determining correlation information between the slices in the slice pair according to the fused feature information and generating a segmentation result of the slice pair based on the correlation information and the initial segmentation results of the slices in the slice pair.

Correspondingly, an embodiment of this disclosure further provides an apparatus for segmenting a medical image. The apparatus may include a memory operable to store computer-readable instructions and a processor operable to read the computer-readable instructions. The processor, when executing the computer-readable instructions, may be configured to obtain a slice pair comprising two slices from a medical image and perform feature extraction on each slice in the slice pair, using different receptive fields, to obtain high-level feature information and low-level feature information of the each slice in the slice pair. The processor may be further configured to segment a target object in each slice in the slice pair according to the low-level feature information and the high-level feature information of the each slice, to obtain an initial segmentation result of the each slice and fuse the low-level feature information and the high-level feature information of the slices in the slice pair to obtain a fused feature information. The processor may be further configured to determine correlation information between the slices in the slice pair according to the fused feature information and generate a segmentation result of the slice pair based on the correlation information and the initial segmentation results of the slices in the slice pair.

Correspondingly, this disclosure further provides an electronic device, including a memory and a processor, the memory storing an application program, the processor being configured to run the application program in the memory, to perform the operations in any method for segmenting a medical image provided in the embodiments of this disclosure.

In addition, an embodiment of this disclosure further provides a non-transitory computer-readable storage medium storing a plurality of processor executable instructions. The instructions may cause the processor to obtain a slice pair comprising two slices from a medical image and perform feature extraction on each slice in the slice pair, using different receptive fields, to obtain high-level feature information and low-level feature information of the each slice in the slice pair. The instructions may further cause the processor to segment a target object in each slice in the slice pair according to the low-level feature information and the high-level feature information of the each slice, to obtain an initial segmentation result of the each slice and fuse the low-level feature information and the high-level feature information of the slices in the slice pair to obtain a fused feature information. The instructions may further cause the processor to determine correlation information between the slices in the slice pair according to the fused feature information and generate a segmentation result of the slice pair based on the correlation information and the initial segmentation results of the slices in the slice pair.

In addition, an embodiment of this disclosure further provides a computer program product, including instructions, the instructions, when being run on a computer, causing the computer to perform the operations in any method for segmenting a medical image provided in the embodiments of this disclosure.

In the embodiments of this disclosure, after a slice pair is obtained, feature extraction may be performed on each slice in the slice pair by using different receptive fields, to obtain high-level feature information and low-level feature information of the each slice. In an aspect, for the each slice in the slice pair, a target object in the slice is then segmented according to the low-level feature information and the high-level feature information of the slice, to obtain an initial segmentation result of the slice. In another aspect, the low-level feature information and the high-level feature information of the slices in the slice pair are fused, and correlation information between the slices in the slice pair is determined according to fused feature information. A segmentation result of the slice pair is then generated based on the correlation information between the slices in the slice pair and the initial segmentation results of the slices in the slice pair. In consideration that slices of a 3D medical image are correlated, in the method provided in the embodiments of this disclosure, two slices (the slice pair) are segmented at the same time, and a segmentation result is further adjusted by using a correlation relationship between the slices, so that shape information of a target object (for example, liver) can be captured more accurately, to achieve higher segmentation accuracy.

BRIEF DESCRIPTION OF THE DRAWINGS

To describe the technical solutions in embodiments of this disclosure more clearly, the following briefly describes the accompanying drawings required for describing the embodiments. Apparently, the accompanying drawings in the following descriptions show only some embodiments of the present disclosure, and a person skilled in the art may still derive other accompanying drawings from the accompanying drawings without creative efforts.

DESCRIPTION OF EMBODIMENTS

Figure 1:
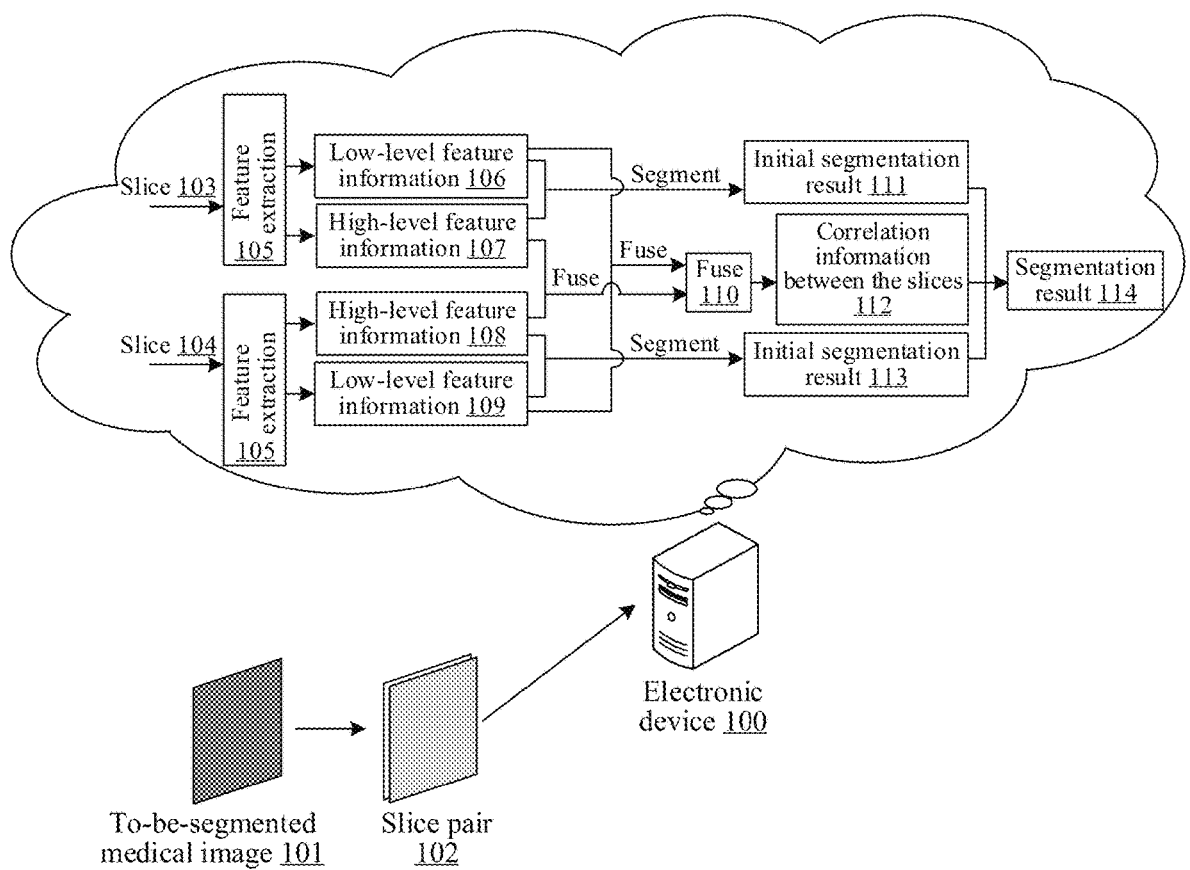
FIG. 1 is a schematic diagram of a scenario of a method for segmenting a medical image according to an embodiment of this disclosure.

The technical solutions in embodiments of this disclosure are clearly and completely described in the following with reference to the accompanying drawings in the embodiments of this disclosure. Apparently, the described embodiments are merely some rather than all of the embodiments of the present disclosure. All other embodiments obtained by persons skilled in the art based on the embodiments of the present disclosure without creative efforts fall within the protection scope of the present disclosure.

AI involves a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies usually include technologies such as image segmentation, image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, or map construction, and further include biological feature recognition technologies such as common face recognition and fingerprint recognition.

Machine learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI. ML and deep learning generally include technologies such as an artificial neural network, a belief network, reinforcement learning, transfer learning, inductive learning, and learning from demonstrations.

A method for segmenting a medical image according to embodiments of this disclosure relates to CV technology and machine learning technology or the like with AI, and is described in detail by using the following embodiments.

Embodiments of this disclosure provide a method and an apparatus for segmenting a medical image, an electronic device, and a storage medium. The apparatus for segmenting a medical image may be integrated in an electronic device. The electronic device may be a server or may be a device such as a terminal.

The image segmentation is a technology and a process of segmenting an image into several particular regions having special properties, and specifying a target of interest. This embodiment of this disclosure is mainly to segment a three-dimensional medical image and find a required target object. For example, a 3D medical image is divided in a z-axis direction into a plurality of single-frame slices (referred to as slices for short). A liver region or the like is then segmented from the slices. After segmentation results of all slices in the 3D medical image are obtained, these segmentation results are combined in the z-axis direction, so that a 3D segmentation result corresponding to a 3D medical image may be obtained. That is, the target object is, for example, a 3D form of the liver region. The segmented target object may be subsequently analyzed by a medical care person or another medical expert for further operation.

For example, referring to FIG. 1, an example in which an apparatus for segmenting a medical image is integrated in an electronic device 100 is used. The electronic device 100 may obtain a slice pair 102 (the slice pair including two slices 103 and 104 by sampling a to-be-segmented medical image 101), perform feature extraction 105 on each slice in the slice pair by using different receptive fields, to obtain high-level feature information 107 and 108 and low-level feature information 106 and 109 of the each slice. In one aspect, the electronic device 100 then segments, for each slice in the slice pair, a target object in the slice according to the low-level feature information 106 and 109 and the high-level feature information 107 and 108 of the slice, to obtain an initial segmentation result 111 and 113 of the slice. In another aspect, the electronic device 100 fuses the low-level feature information 106 and 109 and the high-level feature information 107 and 108 of the slices 104 and 105 in the slice pair 102, determines correlation information between the slices 112 in the slice pair 102 according to fused feature information 110, and further generates a segmentation result 114 of the slice pair based on the correlation information 112 and the initial segmentation results 111 and 113 of the slices 103 and 104 in the slice pair 102.

Detailed descriptions are separately provided below. The description sequence of the following embodiments is not intended to limit preference orders of the embodiments.

The embodiments are described from the perspective of an apparatus for segmenting a medical image. The apparatus for segmenting a medical image may be specifically integrated in an electronic device. The electronic device may be a server or may be a device such as a terminal. The terminal may include a tablet computer, a notebook computer, a personal computer (PC), a medical image acquisition device, another electronic medical care device, or the like.

A method for segmenting a medical image includes: obtaining a slice pair, the slice pair including two slices obtained through sampling of a to-be-segmented medical image; performing feature extraction on each slice in the slice pair by using different receptive fields, to obtain high-level feature information and low-level feature information of the each slice in the slice pair; segmenting, for each slice in the slice pair, a target object in the slice according to the low-level feature information and the high-level feature information of the slice, to obtain an initial segmentation result of the slice; fusing the low-level feature information and the high-level feature information of the slices in the slice pair, and determining correlation information between the slices in the slice pair according to fused feature information; and generating a segmentation result of the slice pair based on the correlation information and the initial segmentation results of the slices in the slice pair.

Figure 2:
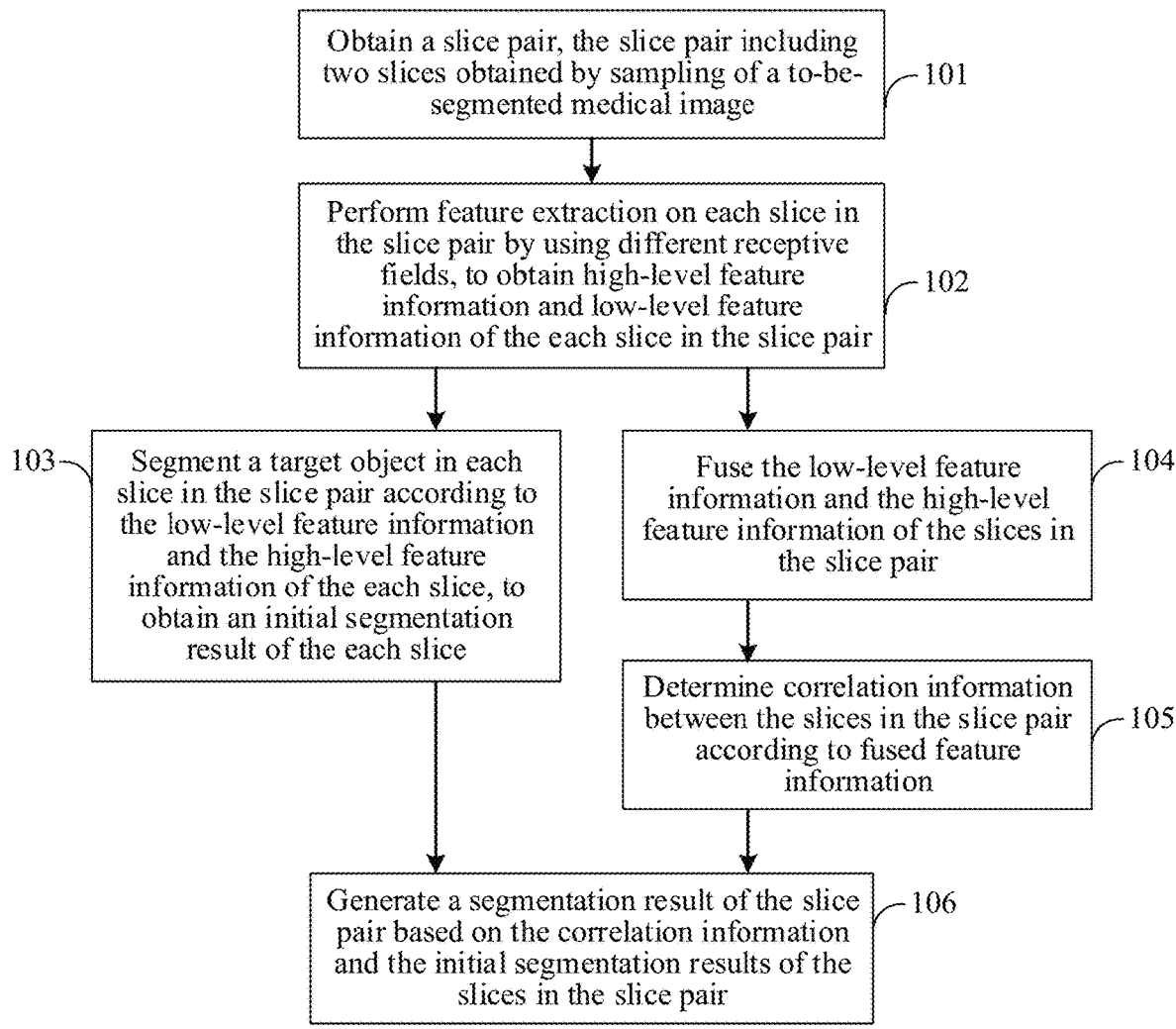
FIG. 2 is a flowchart of a method for segmenting a medical image according to an embodiment of this disclosure.

As shown in FIG. 2, a specific procedure of the method for segmenting a medical image may be as follows:

101. Obtain a slice pair, where the slice pair including two slices by sampling a to-be-segmented medical image.

For example, the to-be-segmented medical image may be obtained. Two slices are sampled from the to-be-segmented medical image. A set formed by the two slices is referred to as a slice pair.

The to-be-segmented medical image may be provided to the apparatus for segmenting a medical image after each medical image acquisition device performs image acquisition on biological tissue (for example, heart or liver). The medical image acquisition device may include an electronic device such as a magnetic resonance imaging (MM) scanner, a CT scanner, a colposcope, or an endoscope.

102. Perform feature extraction on each slice in the slice pair by using different receptive fields, to obtain high-level feature information and low-level feature information of the each slice in the slice pair.

Figure 3:
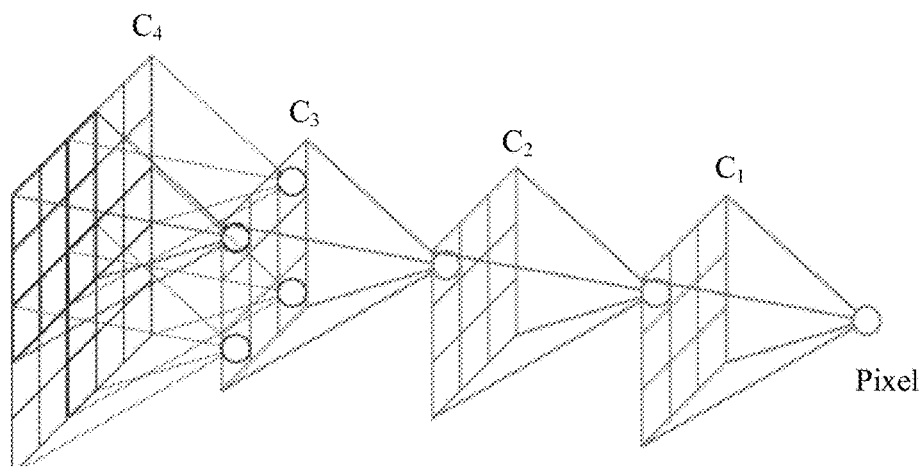
FIG. 3 is a schematic diagram of a receptive field in a method for segmenting a medical image according to an embodiment of this disclosure.

In a convolutional neural network, the receptive field determines a region size of an input layer corresponding to an element in an output result of a layer. That is, the receptive field is a size, mapped on an input image, of an element point of an output result of a layer in the convolutional neural network (that is, a feature map, also referred to as feature information). For example, for details, refer to FIG. 3. Generally, a receptive field size of an output feature map pixel of a first convolutional layer (for example, C1) is equal to a convolution kernel size (a filter size), while a receptive field size of a high convolutional layer (for example, C4) is related to convolution kernel sizes and step sizes of all layers before the high convolutional layer. Therefore, different levels of information may be captured based on different receptive fields, to extract the feature information of different scales. That is, after feature extraction is performed on a slice by using different receptive fields, high-layer feature information of different scales and low-layer feature information of different scales of the slice may be obtained.

There may be a plurality of manners of performing feature extraction on the slice by using different receptive fields. For example, the feature extraction may be implemented by using a residual network. That is, the step of "performing feature extraction on each slice in the slice pair by using different receptive fields, to obtain high-level feature information and low-level feature information of the each slice in the slice pair" may include: performing the feature extraction on the each slice in the slice pair by using a residual network in a trained segmentation model, to obtain the high-level feature information and the low-level feature information of the each slice in the slice pair.

Figure 4:
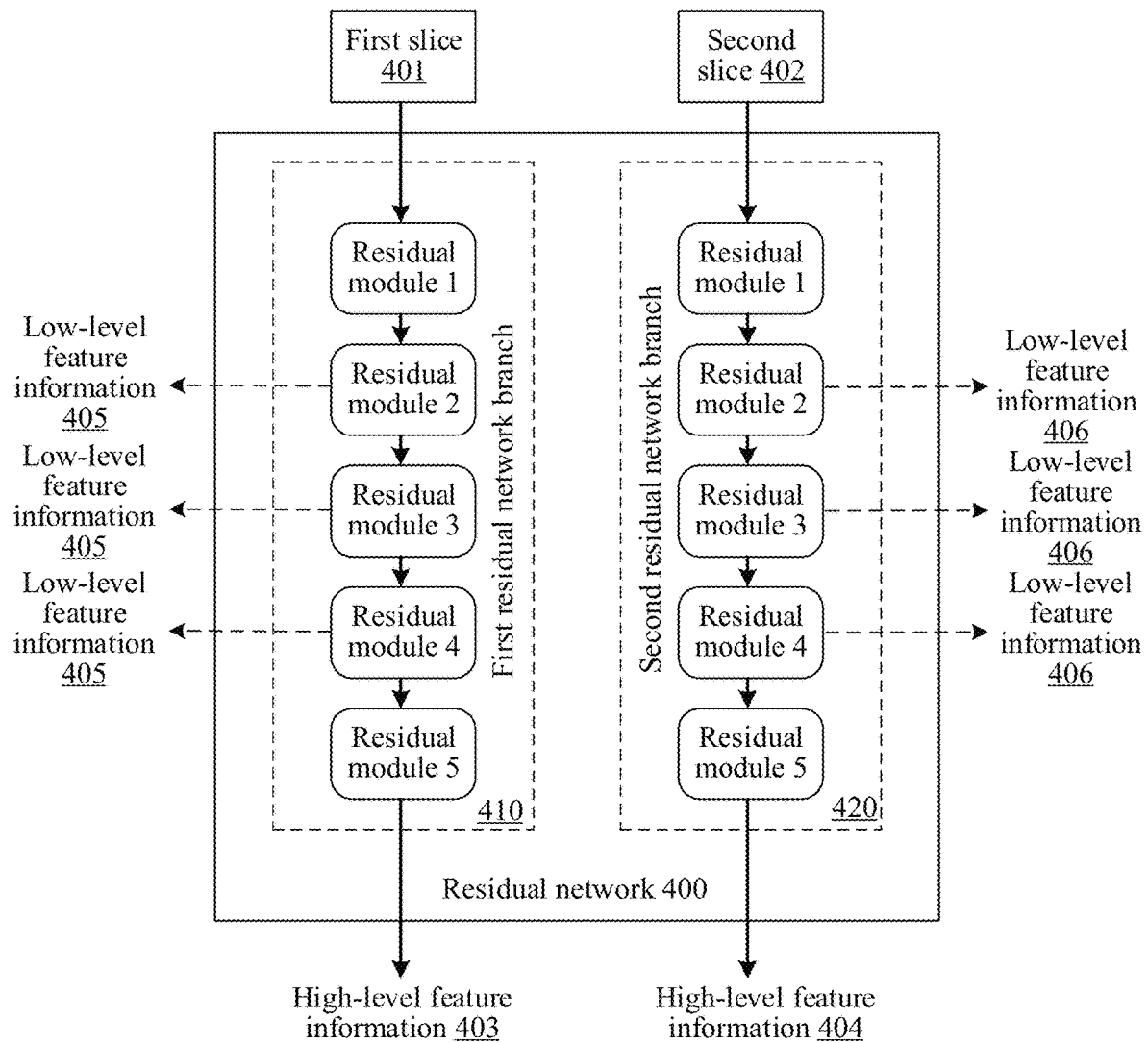
FIG. 4 is a schematic structural diagram of a residual network in an image segmentation model according to an embodiment of this disclosure.

For example, as shown in FIG. 4, an example in which the slice pair includes a first slice 401 and a second slice 402 and the residual network 400 includes a first residual network branch 410 and a second residual network branch 420 that are parallel and have the same structure is used. In this case, feature extraction may be performed on the first slice 401 using the first residual network branch 410 in the residual network 400, to obtain high-level feature information 403 and low-level feature information 405 in different dimensions corresponding to the first slice 41; and feature extraction may be performed on the second slice 402 using the second residual network branch 420 in the residual network 400, to obtain high-level feature information 404 and low-level feature information 406 in different dimensions corresponding to the second slice 402.

The high-level feature information 403 and 404 is a feature graph finally outputted by the residual network 400. The "high-level feature" may generally include information related to classification, advanced extraction or the like. The low-level feature information is a feature graph obtained in a process in which the residual network 400 performs feature extraction on the to-be-segmented medical image. The "low-level feature" may generally include image details such as an edge and texture.

For example, the one residual network branch (for example, a first residual network branch 410 or a second residual network branch 420) includes a plurality of residual modules connected in series. In this case, the high-level feature information is a feature graph outputted by the last residual module. The low-level feature information is a feature graph outputted by a residual module other than the first residual module and the last residual module. The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

For example, referring to FIG. 4, if each residual network branch includes a residual module 1 (patch 1), a residual module 2 (patch 2), a residual module 3 (patch 3), a residual module 4 (patch 4), and a residual module 5 (patch 5), a feature graph outputted by the residual module 5 is high-level feature information, and feature graphs outputted by the residual module 2, the residual module 3, and the residual module 4 are low-level feature information.

The network structure of the first residual network branch and the second residual network branch may be specifically determined according to requirements of actual applications. For example, ResNet-18 (a residual network) may be used. In addition, the first residual network branch and the second residual network branch may share parameters. Specific parameter settings may be determined according to requirements of actual applications.

To obtain the high-level feature information in more dimensions, spatial pyramid pooling (SPP) processing may further be performed on the obtained high-level feature information. For example, referring to FIG. 5, an SPP module, for example, an atrous SPP (ASPP) module, may be respectively added to the first residual network branch and the second residual network branch. Because atrous convolution is used in ASPP, a feature receptive field can be expanded without sacrificing feature spatial resolution. Therefore, high-level feature information in more dimensions can be naturally extracted.

ASPP connected to the first residual network branch and ASPP connected to the second residual network branch may share parameters. Specific parameters of the ASPP may be determined according to requirements of actual applications. Details for this example are described with respect to other embodiments.

Figure 5:
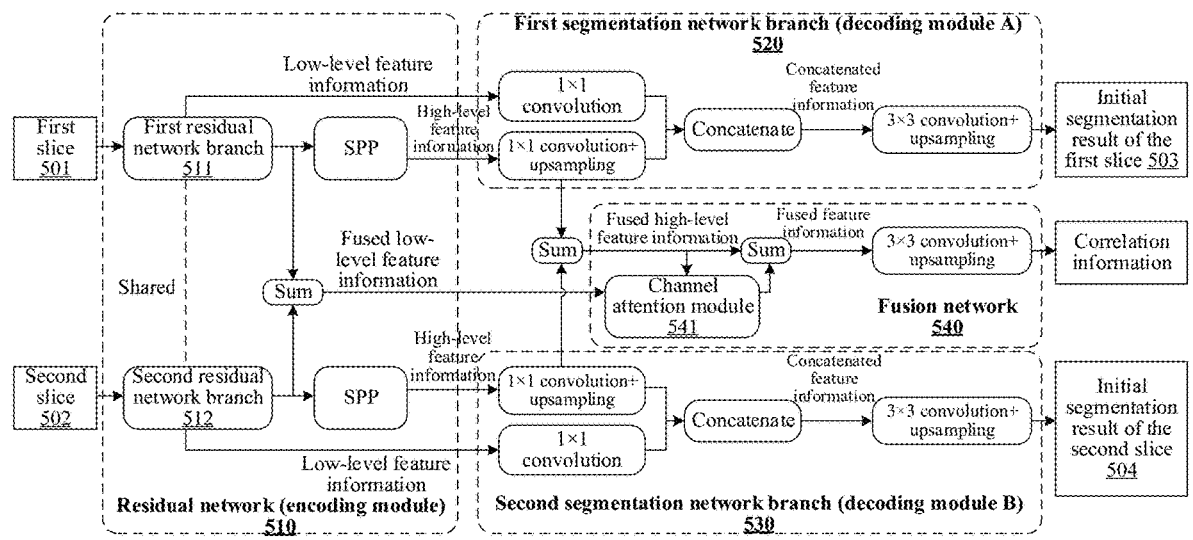
FIG. 5 is a schematic structural diagram of an image segmentation model according to an embodiment of this disclosure.

As shown in FIG. 5, in this embodiment of this disclosure, the residual network part 510 may be considered as the encoding module part in the trained segmentation model.

103. Segment, for each slice in the slice pair, a target object in the slice according to the low-level feature information and the high-level feature information of the slice, to obtain an initial segmentation result of the slice.

For example, for each slice in the slice pair, the target object in the slice may be segmented by using a segmentation network in the trained segmentation model according to the low-level feature information and the high-level feature information of the slice, to obtain the initial segmentation result of the slice. Details may be as follows:

For each slice in the slice pair, convolution (Cony) is separately performed on the low-level feature information and the high-level feature information of the slice by using the segmentation network in the trained segmentation model. The high-level feature information obtained after convolution is upsampled to have the same size as the low-level feature information obtained after convolution, and the upsampled high-level feature information and low-level feature information obtained after convolution are concatenated (Concat), to obtain concatenated feature information. A pixel belonging to the target object in the slice is selected according to the concatenated feature information, to obtain the initial segmentation result of the slice.

The segmentation network may be considered as the decoding module part in the trained segmentation model.

For example, still, the slice pair includes a first slice and a second slice. If the segmentation network includes a first segmentation network branch (a decoding module A) 520 and a second segmentation network branch (a decoding module B) 530 that are parallel and have the same structure. In this case, as shown in FIG. 5, details may be as follows:

(1) Convolution, for example, convolution with a convolution kernel of "1×1", is performed on the low-level feature information of the first slice 501 and the high-level feature information of the first slice 501 by using the first segmentation network branch 520. The high-level feature information obtained after convolution is upsampled to have the same size as the low-level feature information obtained after convolution, and the upsampled high-level feature information and low-level feature information obtained after convolution are concatenated, to obtain the concatenated feature information of the first slice 501. A pixel belonging to the target object in the first slice is then selected according to the concatenated feature information, to obtain the initial segmentation result 503 of the first slice 501. For example, convolution with a convolution kernel of "3×3" may be specifically performed on the concatenated feature information, and upsampling is then performed to obtain a size of the first slice, so that the initial segmentation result 503 of the first slice 501 can be obtained.

(2) Convolution, for example, convolution with a convolution kernel of "1×1", is performed on the low-level feature information of the second slice 502 and the high-level feature information of the second slice by using the second segmentation network branch 530. The high-level feature information obtained after convolution is upsampled to have the same size as the low-level feature information obtained after convolution, and the upsampled high-level feature information and low-level feature information obtained after convolution are concatenated, to obtain the concatenated feature information of the second slice 502. A pixel belonging to the target object in the second slice 502 is then selected according to the concatenated feature information, to obtain the initial segmentation result 504 of the second slice 502. For example, convolution with a convolution kernel of "3×3" may be specifically performed on the concatenated feature information, and upsampling is then performed to obtain a size of the second slice 502, so that the initial segmentation result 504 of the second slice 504 may be obtained.

104. Fuse the low-level feature information and the high-level feature information of the slices in the slice pair.

For example, the low-level feature information and the high-level feature information of the slices in the slice pair may be fused by using a fusion network in the trained segmentation model.

There may be a plurality of methods for fusing the low-level feature information and the high-level feature information. For example, the low-level feature information and the high-level feature information may be fused in a manner of "element-by-element summation (Sum)" or channel superimposition. When "element-by-element summation" is used as an example, the step of "fusing the low-level feature information and the high-level feature information of the slices in the slice pair by using a fusion network in the trained segmentation model" may include the following steps:

(1) Perform element-by-element summation on the low-level feature information of the slices in the slice pair, to obtain fused low-level feature information.

For example, as shown in FIG. 5, an example in which the slice pair includes a first slice 501 and a second slice 502 is used. In this case, element-by-element summation may be performed on the low-level feature information of the first slice 501 and the low-level feature information of the second slice 502, to obtain the fused low-level feature information.

(2) Perform element-by-element summation on the high-level feature information of the slices in the slice pair, to obtain fused high-level feature information.

For example, as shown in FIG. 5, an example in which the slice pair includes a first slice 501 and a second slice 502 is still used. In this case, element-by-element summation may be performed on the high-level feature information of the first slice 501 and the high-level feature information of the second slice 502, to obtain the fused high-level feature information.

(3) Fuse the fused low-level feature information and the fused high-level feature information by using the fusion network in the trained segmentation model, to obtain the fused feature information. For example, fusion may be specifically performed in any following manner:

A. First Manner:

Element-by-element summation is performed on the fused low-level feature information and the fused high-level feature information, to obtain the fused feature information by using the fusion network 540 in the trained segmentation model.

Because the effects of different features in a specific task have different weights, to effectively assign appropriate significance to different features to make better use of the features to improve the accuracy of image segmentation, an attention mechanism may further be used to enable the network to automatically assign different weights to different feature information, so that the network can selectively fuse feature information.

That is, in addition to the first manner, a second manner may be used to fuse the fused low-level feature information and the fused high-level feature information as follows:

B. Second Manner:

A weight is assigned to the fused low-level feature information according to the fused low-level feature information and the fused high-level feature information by using a channel attention module 541 in the fusion network 540 in the trained segmentation model, to obtain weighted feature information; and element-by-element multiplication is performed on the weighted processing feature and the fused low-level feature information, to obtain the processed feature information, and element-by-element summation is performed on the processed feature information and the fused high-level feature information, to obtain the fused feature information, referring to FIG. 5.

Figure 6:
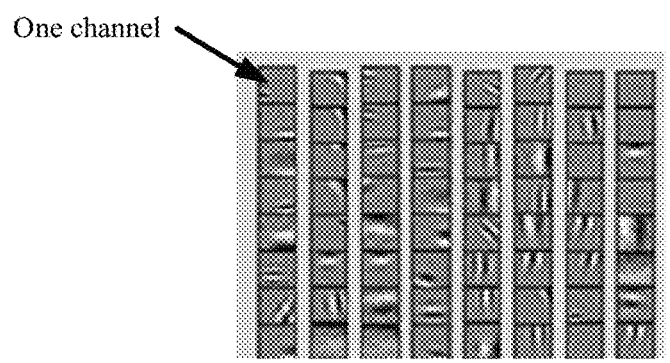
FIG. 6 is a schematic diagram of signal components in a method for segmenting a medical image according to an embodiment of this disclosure.

The channel attention module is a network module using an attention mechanism of a channel domain. In a convolution neural network, each image is initially represented by three channels (R, G, and B channels). Next, after passing through different convolution kernels, each channel generates a new signal. For example, each channel of an image feature uses 64-kernel convolution, and a matrix of 64 new channels (H, W, 64) is generated. H and W respectively represent the height and width of the image feature, or the like. Features of channels actually represent components of the image in different convolution kernels. This is similar to time-frequency transform. The convolution using a convolution kernel herein is similar to Fourier transform on the signal, so that information of the feature in one channel can be divided into signal components in 64 convolution kernels, for example, referring to FIG. 6. Because each signal can be divided into signal components in 64 convolution kernels (equivalent to 64 generated channels). However, the new 64 channels have varied contributions rather than the same contribution to critical information. Therefore, a weight may be assigned to each channel to represent a correlation between a channel and the critical information (information that is critical for a segmentation task), so that when the weight of the channel is larger, the correlation is higher. A channel with a higher correlation is a channel that requires more attention. In view of this, the mechanism is referred to as an "attention mechanism of a channel domain".

Figure 7:
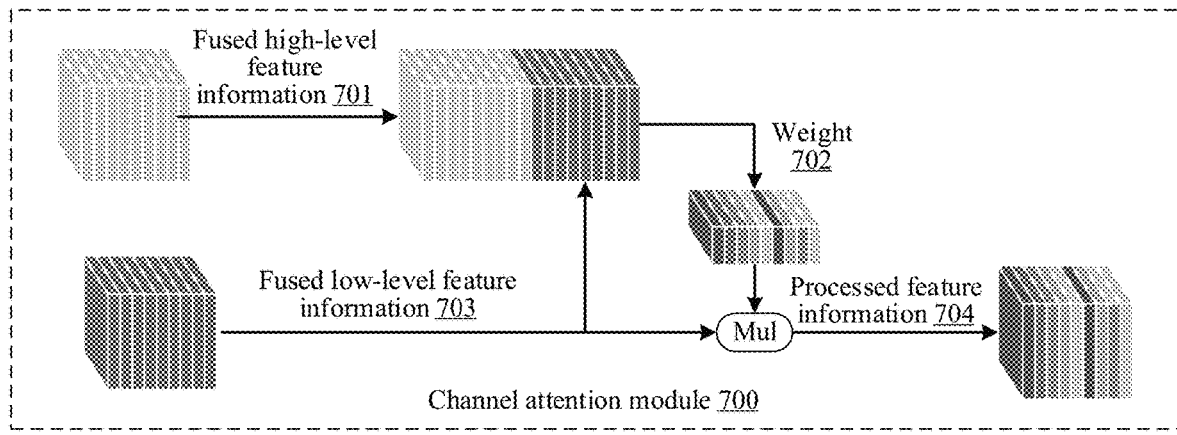
FIG. 7 is a schematic structural diagram of a channel attention module in an image segmentation model according to an embodiment of this disclosure.

The structure of the channel attention module may be specifically determined according to requirements of actual applications. For example, as shown in FIG. 7, specifically, a weight 702 may be assigned to the fused low-level feature information 701 according to the fused low-level feature information 701 and the fused high-level feature information 703 by using a channel attention module 700 in the fusion network in the trained segmentation model, to obtain weighted feature information, element-by-element multiplication (Mul) is then performed on the weighted feature information and the fused low-level feature information 703, to obtain the processed feature information 704, and element-by-element summation is then performed on the processed feature information 704 and the fused high-level feature information 701, to obtain the fused feature information.

Steps 103 and 104 may be performed in different orders. Details for this example are described with respect to other embodiments.

105. Determine correlation information between the slices in the slice pair according to fused feature information.

For example, correlation information may be determined between the slices in the slice pair according to fused feature information by using the fusion network in the trained segmentation model. For example, a feature belonging to the target object may be specifically selected from the fused feature information, and the correlation information between the slices in the slice pair is determined according to the selected feature (that is, a feature belonging to the target object).

The target object is an object that needs to be recognized from a slice, for example, "liver" in the segmentation of a liver image, "heart" in the segmentation of a heart image, or the like.

There may be a plurality of manners of determining the correlation information between slices according to the fused feature information. The manners may be, for example, as follows:

(1) Determine a background region and a foreground region of each slice in the slice pair according to the selected feature.

In one example, the target object is specifically liver. In this case, it may be determined that a region in which selected features belonging to liver are located is the foreground region of the slice, and the remaining region in the slice is the background region of the slice.

In another example, the target object is specifically heart. In this case, it may be determined that a region in which selected features belonging to heart are located is the foreground region of the slice, and the remaining region in the slice is the background region of the slice.

(2) Calculate a difference pixel and an intersection pixel between the foreground regions of the slices in the slice pair.

For example, in the fused feature information, pixels only belonging to the foreground region of any one slice in the slice pair may be specifically combined to obtain a pixel set of a difference region, which is referred to as a difference pixel for short. In the fused feature information, pixels belonging to both the foreground regions of the two slices in the slice pair are combined to obtain a pixel set of an intersection region, which is also referred to as an intersection pixel for short.

The fused feature information may be considered as feature information corresponding to a superimposed slice obtained after "all slices in the slice pair are superimposed". Therefore, in the superimposed slice, a pixel in a region in which the foreground regions (the foreground region of two slices) do not overlap is obtained, so that the difference pixel may be obtained. Similarly, a pixel in a region in which the foreground regions overlap is obtained, so that the intersection pixel may be obtained.

(3) The correlation information between slices is generated according to the background region, the difference pixel, and the intersection pixel of each slice.

For example, in the fused feature information (superimposed slice), pixels belonging to both slices in the background region of the slice pair may be used as the background region of the slice pair. In other words, that is, an intersection part of background regions of all slices is used as the background region of the slice pair. Pixel type identification is then performed on the background region of the slice pair, the difference pixel, and the intersection pixel, to obtain the correlation information between the slices.

For example, different pixel values may be used to perform pixel type identification on these regions. For example, the value of a pixel in the background region of the slice pair may be set to "0", the value of the difference pixel may be set to "1", and the value of the intersection pixel may be set to "2". Alternatively, for example, the value of a pixel in the background region may be set to "0", the value of the difference pixel may be set to "2", and the value of the intersection pixel may be set to "1".

Different colors may be used to perform pixel type identification on these regions. For example, the background region may be set to "black", the value of the difference pixel may be set to "red", and the value of the intersection pixel may be set to "green". Alternatively, for example, the value of a pixel in the background region may be set to "black", the value of the difference pixel may be set to "green", and the value of the intersection pixel may be set to "red".

106. Generate a segmentation result of the slice pair based on the correlation information between the slices in the slice pair and the initial segmentation results of the slices in the slice pair.

For example, the slice pair includes a first slice and a second slice is used as an example. In this case, the step of "generating a segmentation result of the slice pair based on the correlation information between the slices in the slice pair and the initial segmentation results of the slices in the slice pair" may include the following steps:

(1) Predict a segmentation result of the second slice according to the correlation information between the slices in the slice pair and an initial segmentation result of the first slice, to obtain the predicted segmentation result of the second slice.

In this case, the correlation information between the slices is the correlation information between the first slice and the second slice, and may reflect the difference pixel, the intersection pixel, or the like between the first slice and the second slice. Therefore, the segmentation result of the second slice may be predicted according to the correlation information and the initial segmentation result of the first slice.

For example, the difference pixel of the first slice and the second slice is a region A, the intersection pixel is a region B, and the initial segmentation result of the first slice is a region C, so that the predicted segmentation result of the second slice is "$\{(A \cup B) \backslash C\} \cup B$". "$\cup$" represents a "union", and "$\backslash$" represents a difference.

(2) Predict a segmentation result of the first slice according to the correlation information between the slices in the slice pair and an initial segmentation result of the second slice, to obtain the predicted segmentation result of the first slice.

Similar to the predicted segmentation result of the second slice, if the difference pixel of the first slice and the second slice is a region A, the intersection pixel is a region B, the initial segmentation result of the second slice is a region D, so that the predicted segmentation result of the first slice is "$\{(A \cup B) \backslash D\} \cup B$".

(3) Adjust the initial segmentation result of the first slice based on the predicted segmentation result of the first slice, to obtain the adjusted segmentation result of the first slice, which may be specifically as follows: averaging the predicted segmentation result of the first slice and the initial segmentation result of the first slice, to obtain the adjusted segmentation result of the first slice.

That is, the value of a pixel in the predicted segmentation result of the first slice and the value of a pixel at the same position in the initial segmentation result of the first slice are averaged, and an average value of the pixel is used as the value of the pixel at the same position in the adjusted segmentation result of the first slice.

(4) Adjust the initial segmentation result of the second slice based on the predicted segmentation result of the second slice, to obtain the adjusted segmentation result of the second slice, which may be specifically as follows: averaging the predicted segmentation result of the second slice and the initial segmentation result of the second slice, to obtain the adjusted segmentation result of the second slice.

That is, the value of a pixel in the predicted segmentation result of the second slice and the value of a pixel at the same position in the initial segmentation result of the second slice are averaged, and an average value of the pixel is used as the value of the pixel at the same position in the adjusted segmentation result of the second slice.

(5) Fuse the adjusted segmentation result of the first slice and the adjusted segmentation result of the second slice, to obtain the segmentation result of the slice pair, which may be specifically as follows: averaging the adjusted segmentation result of the first slice and the adjusted segmentation result of the second slice, and binarizing an averaged result, to obtain the segmentation result of the slice pair.

That is, the value of a pixel in the adjusted segmentation result of the first slice and the value of a pixel at the same position in the adjusted segmentation result of the second slice are averaged, and an average value of the pixel is used as the value of the pixel at the same position in the segmentation result of the slice pair.

The binarization is to set the grayscale value of a pixel in the image is 0 or 255, that is, to make the entire image present a clear visual effect of only black and white.

As can be learned from the foregoing description of the embodiments, the trained segmentation model in the embodiments of this disclosure may include a residual network, a segmentation network, a fusion network, or the like. The residual network may include a first residual network branch and a second residual network branch that are parallel. The segmentation network may include a first segmentation network branch and a second segmentation network branch that are parallel. The residual network part may be considered as an encoder part of a trained image segmentation model, which is also referred to as an encoding module, and is configured to extract feature information. The segmentation network may be considered as a decoder part of the trained segmentation model, which is also referred to as a decoding module, and is configured to perform classification and segmentation according to the extracted feature information.

The trained segmentation model may be trained by using a plurality of slice sample pairs annotated with true values. Specifically, the trained segmentation model may be preset by operations personnel or may be trained by the apparatus for segmenting a medical image. That is, before the step of "performing the feature extraction on the each slice in the slice pair by using a residual network in a trained segmentation model, to obtain the high-level feature information and the low-level feature information of the each slice", the method for segmenting a medical image may further include the following steps:

S1. Acquire a plurality of slice sample pairs annotated with true values, the slice sample pair including two slice samples obtained through sampling of a medical image sample.

For example, a plurality of medical images may be specifically acquired for use as an original data set. For example, the original data set may be obtained from a database, a network or the like. Medical images in the original data set are then preprocessed, to obtain an image that meets an input standard of a preset segmentation model. That is, a medical image sample may be obtained. The obtained medical image sample is segmented into slices (referred to as slice samples in this embodiment of this disclosure). Target object annotation (referred to as true value annotation) is then performed on each slice sample, and every two slice samples form one set, so that a plurality of slice sample pairs annotated with true values may be obtained.

The preprocessing may include operations such as deduplication, cropping, rotation flipping, and/or the like. For example, an input size of a preset segmentation network is "128*128*32 (width*height*depth)". In this case, images in the original data set may be cropped into images with a size of "128*128*32". Certainly, other preprocessing operations may further be performed on these images.

S2. Perform feature extraction on each slice sample in the slice sample pair by using a residual network in a preset segmentation model, to obtain high-level feature information and low-level feature information of the each slice sample.

For example, the slice sample pair includes a first slice sample and a second slice sample, and the residual network includes a first residual network branch and a second residual network branch that are parallel. In this case, feature extraction may be performed on the first slice sample by using the first residual network branch in the residual network, to obtain high-level feature information in different dimensions and low-level feature information in different dimensions corresponding to the first slice sample; and feature extraction is performed on the second slice sample by using the second residual network branch in the residual network, to obtain high-level feature information in different dimensions and low-level feature information in different dimensions corresponding to the second slice sample.

S3. Segment, for each slice sample in the slice sample pair, a target object in the slice sample by using a segmentation network in the preset segmentation model according to the low-level feature information and the high-level feature information of the slice sample, to obtain a predicted segmentation value (that is, a predicted probability plot) of the slice sample.

For example, the slice sample pair includes a first slice sample and a second slice sample. If the segmentation network includes a first segmentation network branch and a second segmentation network branch that are in parallel. In this case, the following operation may be performed:

A. Convolution, for example, convolution with a convolution kernel of "1×1", is performed on the low-level feature information of the first slice sample and the high-level feature information of the first slice sample by using the first segmentation network branch. The high-level feature information obtained after convolution is upsampled to have the same size as the low-level feature information obtained after convolution, and the upsampled high-level feature information and low-level feature information obtained after convolution are concatenated, to obtain concatenated feature information of the first slice sample. A pixel belonging to a target object in the first slice sample is then selected according to the concatenated feature information, to obtain the first predicted segmentation value of the slice sample. For example, convolution with a convolution kernel of "3×3" may be specifically performed on the concatenated feature information, and upsampling is performed to obtain a size of the first slice sample, so that the first predicted segmentation value of the slice sample can be obtained.

B. Convolution, for example, convolution with a convolution kernel of "1×1", is performed on the low-level feature information of the second slice sample and the high-level feature information of the second slice sample by using the second segmentation network branch. The high-level feature information obtained after convolution is upsampled to have the same size as the low-level feature information obtained after convolution, and the upsampled high-level feature information and low-level feature information obtained after convolution are concatenated, to obtain the concatenated feature information of the second slice sample. A pixel belonging to a target object in the second slice sample is then selected according to the concatenated feature information, to obtain the second predicted segmentation value of the slice sample. For example, convolution with a convolution kernel of "3×3" may be specifically performed on the concatenated feature information, and upsampling is performed to obtain a size of the second slice sample, so that the second predicted segmentation value of the slice sample can be obtained.

S4. Fuse the low-level feature information and the high-level feature information of the slice samples in the slice sample pair by using a fusion network in the preset segmentation model, and predict correlation information between the slice samples in the slice sample pair according to the fused feature information.

For example, element-by-element summation may be performed on the low-level feature information of the slice samples in the slice sample pair, to obtain fused low-level feature information, and element-by-element summation may be performed on the high-level feature information of the slice samples in the slice sample pair, to obtain the fused high-level feature information. The fused low-level feature information and the fused high-level feature information are then fused by using the fusion network in the preset segmentation model, to obtain the fused feature information. Further, a feature belonging to the target object from the fused feature information may be selected, and correlation information between the slice samples in the slice sample pair is determined according to the selected feature.

For the details of the manner of fusing the fused low-level feature information and the fused high-level feature information, reference may be made to the foregoing embodiments. In addition, the manner of calculating correlation information between the slice samples in the slice sample pair is also the same as the manner of calculating the correlation information between the slices in the slice pair. For details, reference may be made to the foregoing embodiments. Details for this example are described with respect to other embodiments.

S5. Converge the preset segmentation model according to the true values, the predicted segmentation values of the slice samples in the slice sample pair, and the predicted correlation information, to obtain the trained segmentation model.

For example, the preset segmentation model may be specifically converged according to the true values, the predicted segmentation value, and the predicted correlation information by using a loss function, for example, a Dice loss function, to obtain the trained segmentation model.

The loss function may be specifically set according to requirements of actual applications. For example, the slice sample pair includes a first slice sample $x^i$ and a second slice sample $x^j$. If an true value annotated for the first slice sample $x^i$ is $y^i$ and an true value annotated for the second slice sample $x^j$ is $y^j$, the Dice loss function of the first segmentation network branch may be as follows:

$$\mathcal{L}_1(y^i, p^i) = \frac{2\sum_{s,t} y^i_{st} p^i_{st}}{\sum_{s,t} y^i_{st} + p^i_{st}}, \text{ and}$$

the Dice loss function of the second segmentation network branch may be as follows:

$$\mathcal{L}_2(y^j, p^j) = \frac{2\sum_{s,t} y^j_{st} p^j_{st}}{\sum_{s,t} y^j_{st} + p^j_{st}},$$

where $p^i$ and $p^j$ are respectively the predicted segmentation values of the first segmentation network branch and the second segmentation network branch, s and t are respectively position indices of a row and a column in a slice, $y_{st}^i$ represents an true value annotated for the pixel with a position index of (s, t) in the first slice sample, $p_{st}^i$ represents a predicted segmentation value of the pixel with the position index of (s, t) in the first slice sample; and $y_{st}^j$ represents an true value annotated for a pixel with a position index of (s, t) in the second slice sample, and $p_{st}^j$ represents a predicted segmentation value of the pixel with the position index of (s, t) in the second slice sample.

For example, the correlation information between slices outputted by the fusion network includes three relationship types: a background region, an intersection pixel, and a difference pixel. The Dice loss function of the fusion network may be calculated according to the foregoing two Dice loss functions:

$$\mathcal{L}_{proxy}(y^{ij}, p^{ij}) = \frac{1}{3} \sum_{\ell \in \{0,1,2\}} \frac{2\sum_{s,t} y^{ij\ell}_{st} p^{ij\ell}_{st}}{\sum_{s,t} \left(y^{ij\ell}_{st} + p^{ij\ell}_{st}\right)},$$

where $y^{ij}$ is the true value of a correlation relationship between the first slice sample $x^i$ and the second slice sample $x^j$. The true value of the correlation relationship may be calculated according to an true value annotated for the first slice sample $x^i$ and an true value annotated for the second slice sample $x^j$. For example, a background region of an image obtained after the first slice sample $x^i$ and the second slice sample $x^j$ are superimposed and a difference and an intersection between the true value annotated for the first slice sample $x^i$ and the true value annotated for the second slice sample $x^j$ may be determined. The background region, difference, and intersection obtained herein are true values of "the background region, the difference pixel, and the intersection pixel" obtained after the first slice sample $x^i$ and the second slice sample $x^j$ are superimposed, that is, the true values of the correlation relationship discussed in the embodiments of this disclosure.

$p^{ij}$ is the correlation relationship between the first slice sample $x^i$ and the second slice sample $x^j$ outputted by the fusion network, s and t are respectively position indices of a row and a column in a slice, $y_{st}^{ij\ell}$ represents the true value of the correlation relationship between the superimposed pixels with a position index of (s, t) in the superimposed slice samples, $p_{st}^{ij\ell}$ represents a predicted value (that is, the correlation relationship outputted by the fusion network) of the correlation relationship between the superimposed pixels with the position index of (s, t) in the superimposed slice samples; and $\ell$ is a classification index for the foregoing three relationship types (that is, the background region, the intersection pixel, and the difference pixel).

A general loss function $\mathcal{L}(y^i,p^i,y^j,p^j,y^{ij},p^{ij};\Theta)$ of the image segmentation model may be calculated according to the Dice loss function of the first segmentation network branch, the Dice loss function of the second segmentation network branch, and the Dice loss function of the fusion network:

$$\mathcal{L}_{(y^i,p^i,y^j,p^j,y^{ij},p^{ij};\Theta)} = \lambda_1 \mathcal{L}_1(y^i,p^i) + \lambda_2 \mathcal{L}_2(y^j,p^j) + \lambda_3 \mathcal{L}_{proxy}(y^{ij},p^{ij}),$$

where $\lambda_1$, $\lambda_2$, and $\lambda_3$ are manually set hyperparameters, and are used to balance the contributions of losses of various parts to the general loss.

As can be learned from above, in this embodiment, after a slice pair is obtained, feature extraction may be performed on each slice in the slice pair by using different receptive fields, to obtain high-level feature information and low-level feature information of the each slice. In an aspect, for the each slice in the slice pair, a target object in the slice is then segmented according to the low-level feature information and the high-level feature information of the slice, to obtain an initial segmentation result of the slice. In another aspect, the low-level feature information and the high-level feature information of the slices in the slice pair are fused, and correlation information between the slices in the slice pair is determined according to fused feature information. Finally, a segmentation result of the slice pair is generated based on the correlation information between the slices in the slice pair and the initial segmentation results of the slices in the slice pair. In the method provided in the embodiments of this disclosure, in consideration that slices of a 3D medical image are correlated, two slices (the slice pair) are segmented at the same time, and a segmentation result is further adjusted by using a correlation relationship between the two slices, so that it is ensured that shape information of a target object (for example, liver) can be captured more accurately, to achieve higher segmentation accuracy.

According to the foregoing method described in the embodiments, examples are given for further detailed description below.

In this embodiment, an example in which the apparatus for segmenting a medical image is integrated in the electronic device and a target object of the apparatus for segmenting a medical image is liver is used for description.

(I) Training of an Image Segmentation Model

Figure 8:
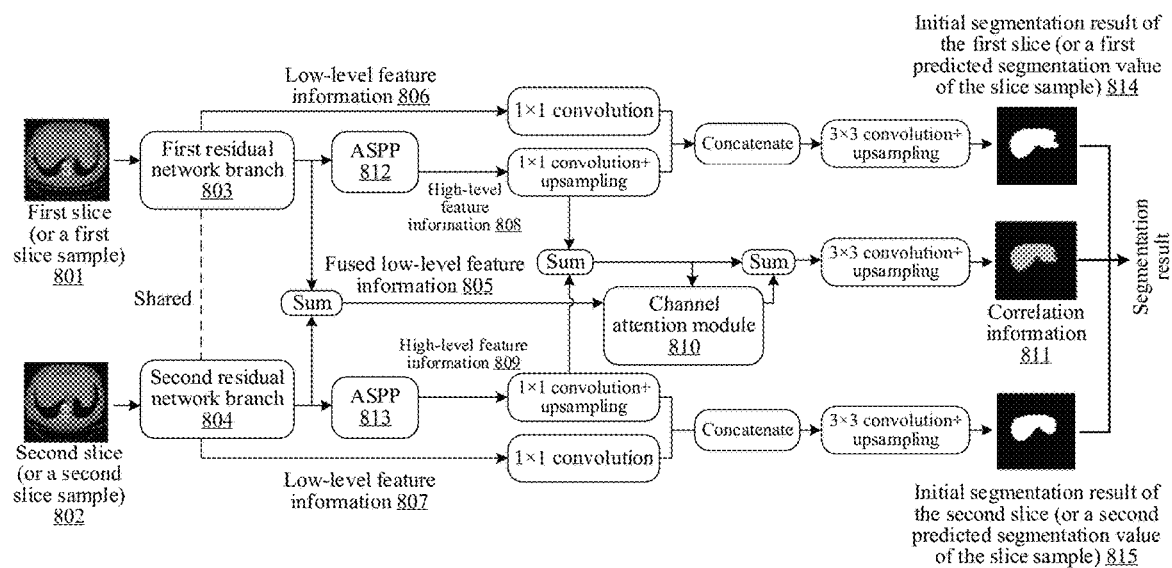
FIG. 8 is another schematic structural diagram of an image segmentation model according to an embodiment of this disclosure.

As shown in FIG. 5 and FIG. 8, the image segmentation model may include a residual network, a segmentation network, and a fusion network. The residual network may include two residual network branches that are parallel and have the same structure, namely, a first residual network branch and a second residual network branch. An atrous convolution SPP (ASPP) module may further be connected to each residual network branch. The residual network is used as an encoding module of the image segmentation model, may be configured to perform feature information extraction on an input image, for example, the slices in the slice pair or slice samples in the slice sample pair.

Similarly, the segmentation network may include two segmentation network branches that are parallel and have the same structure, namely, a first segmentation network branch and a second segmentation network branch. The segmentation network is used as a decoding module of the image segmentation model, and is configured to segment a target object, for example, liver, according to the feature information extracted by the encoding module.

The fusion network is configured to predict a correlation relationship between the slices in the slice pair (or the slice samples in the slice sample pair) according to the feature information extracted by the encoding module. Based on the structure of the image segmentation model, a training manner of the image segmentation model is described below in detail.

First, the electronic device may acquire a plurality of 3D medical images including a liver structure. For example, a plurality of 3D medical images including a liver structure are obtained from a database, a network, or the like. These 3D medical images are preprocessed. For example, an operation such as deduplication, cropping, rotation, flipping, and/or the like is performed, to obtain an image that meets an input standard of a preset segmentation model. The image is used as a medical image sample. The image is then sampled in a z-axis (3D coordinate axes are {x, y, z}) direction of the medical image sample according to a particular time interval, to obtain a plurality of slice samples. Subsequently, information such as a liver region is annotated in each slice sample, and every two slice samples form one set, so that a plurality of slice sample pairs annotated with an true value may be obtained.

When slice samples form a slice sample pair, a plurality of combination manners may be used. For example, a slice sample 1 and a slice sample 2 form a slice sample pair 1, and the slice sample 1 and a slice sample 3 then form a slice sample pair 2, or the like. In this way, in different combination manners, a finite quantity of slice samples may be augmented to obtain more training data (that is, data augmentation), so that the image segmentation model can be trained even with a small amount of manually annotated data.

Next, after a plurality of slice sample pairs annotated with true values are obtained, the electronic device may input the slice sample pairs into a preset image segmentation model, and perform feature extraction on the slice sample pairs by using a residual network. For example, feature extraction may be specifically performed on a first slice sample in the slice sample pair by using a first residual network branch, to obtain high-level feature information in different dimensions and low-level feature information in different dimensions corresponding to the first slice sample; and feature extraction may be performed on the second slice sample in the slice sample pair by using a second residual network branch, to obtain high-level feature information in different dimensions and low-level feature information in different dimensions corresponding to the second slice sample.

The high-level feature information corresponding to the first slice sample and the high-level feature information corresponding to the second slice sample may be further processed by using ASPP, to obtain high-level feature information in more different dimensions, referring to FIG. 8.

Moreover, after the high-level feature information and the low-level feature information corresponding to the first slice sample and the high-level feature information and the low-level feature information corresponding to the second slice sample are obtained, in an aspect, the electronic device may respectively segment liver from the first slice sample and the second slice sample by using the first segmentation network branch and the second segmentation network branch according to the high-level feature information and the low-level feature information, to obtain the first predicted segmentation value of the slice sample and the second predicted segmentation value of the slice sample. In another aspect, the electronic device may fuse the low-level feature information and the high-level feature information of the first slice sample and the second slice sample by using the fusion network, and predict the correlation information between the first slice sample and the second slice sample according to the fused feature information. For example, details may be as follows:

Referring to FIG. 8, element-by-element summation may be performed on the low-level feature information 806 of the first slice sample 801 and the low-level feature information 807 of the second slice sample 802, to obtain fused low-level feature information 805, and element-by-element summation may be performed on the high-level feature information 808 of the first slice sample 801 and the high-level feature information 809 of the second slice sample 802, to obtain the fused high-level feature information. A weight is then assigned to the fused low-level feature information according to the fused low-level feature information and the fused high-level feature information by using the channel attention module 810, to obtain the weighted feature information. Element-by-element multiplication (Mul) is further performed on the weighted feature information and the fused low-level feature information to obtain the processed feature information, and element-by-element summation is performed on the processed feature information and the fused high-level feature information, so that the fused feature information may be obtained. Subsequently, features belonging to liver may be selected from the fused feature information, and the correlation information 811 between the first slice sample 801 and the second slice sample 802 is predicted according to the selected features belonging to liver. For example, the background region between the first slice sample 801 and the second slice sample 802 and the intersection pixel, the difference pixel, and the like between the first slice sample 801 and the second slice sample 802 may be predicted.

Finally, the preset image segmentation model may be converged by using the true values annotated in the slice sample pair, the predicted segmentation values of the slice samples in the slice sample pair, and the predicted correlation information, to obtain the trained image segmentation model.

The true value annotated for the slice sample pair includes a liver region annotated in the first slice sample and a liver region annotated in the second slice sample. An actual correlation relationship between the first slice sample and the second slice sample may be further determined by using the liver region annotated in the first slice sample and the liver region annotated in the second slice sample, and includes the background region of the slice sample pair formed by the first slice sample and the second slice sample, an actual difference pixel between the first slice sample and the second slice sample, an actual intersection pixel between the first slice sample and the second slice sample, and the like.

The actual background region of the slice sample pair formed by the first slice sample and the second slice sample may be obtained by obtaining an intersection part between the background region of the first slice sample and the background region of the second slice sample after the first slice sample and the second slice sample are superimposed. Actual difference pixels between the first slice sample and the second slice sample and actual intersection pixels between the first slice sample and the second slice sample may be obtained by calculating a difference between the liver region annotated in the first slice sample and the liver region annotated in the second slice sample and calculating an intersection between the liver region annotated in the first slice sample and the liver region annotated in the second slice sample.

To rapidly and conveniently recognize the actual correlation relationship between the first slice sample and the second slice sample, different types of regions may be identified with different colors or pixel values in the superimposed images of the liver region annotated in the first slice sample and the liver region annotated in the second slice sample. For example, referring to FIG. 9 and FIG. 10, the color of the background region of the slice sample pair may be identified with black, the color of the intersection pixel may be identified with red (white in FIG. 9 and FIG. 10), and the color of the intersection pixel may be identified with green (gray in FIG. 9 and FIG. 10). Alternatively, for example, the value of a pixel in the background region of the slice sample pair may be set to 0, the value of a pixel in the intersection pixel may be set to 1, and the value of a pixel in the intersection pixel may be set to 2.

Figure 9:
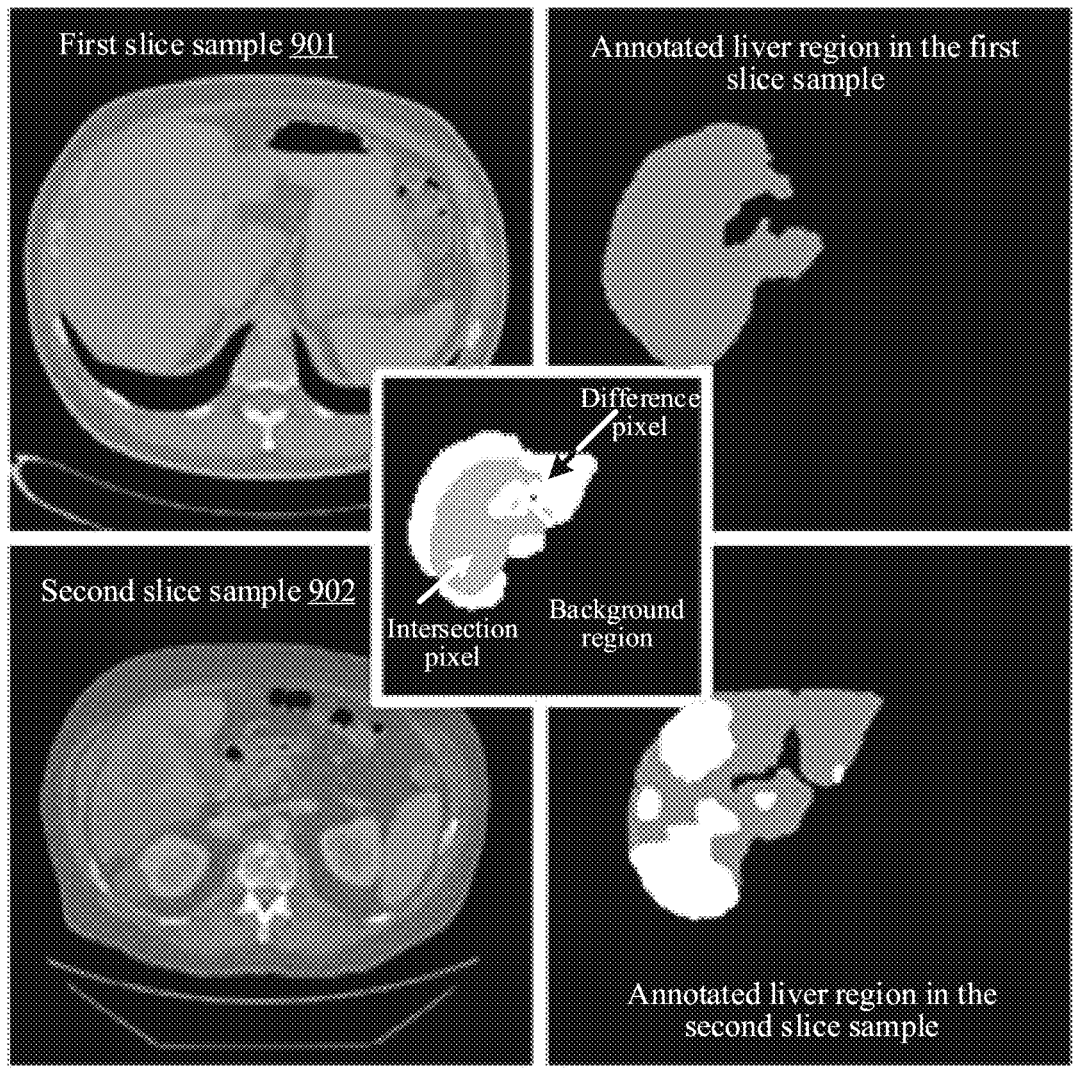
FIG. 9 is a schematic diagram of a correlation relationship in a method for segmenting a medical image according to an embodiment of this disclosure.
Figure 10:
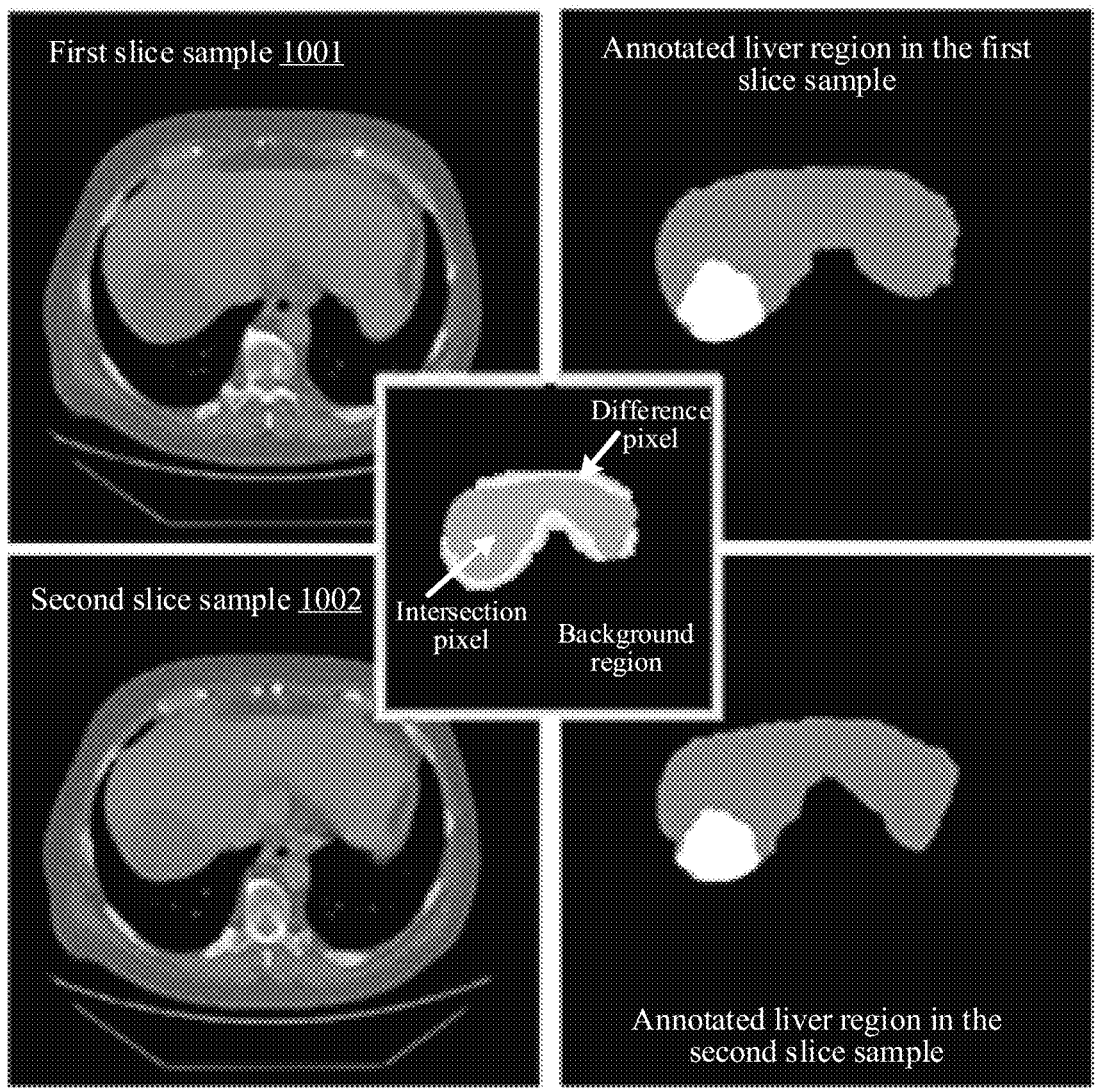
FIG. 10 is another schematic diagram of a correlation relationship in a method for segmenting a medical image according to an embodiment of this disclosure.

The images at the centers of FIG. 9 and FIG. 10 are the superimposed images of the liver region annotated in the first slice sample and the liver region annotated in the second slice sample. In addition, the first slice sample 901 and the second slice sample 902 in FIG. 9 are sampled from different CT images, and the first slice sample 1001 and the second slice sample 1002 in FIG. 10 are sampled from the same CT image.

During specific convergence, convergence may be used by using a Dice loss function. The Dice loss function $\mathcal{L}(y^i, p^i, y^j, p^j, y^{ij}, p^{ij}; \Theta)$ may be specifically as follows:

$$\mathcal{L}_{(y^i,p^i,y^j,p^j,y^{ij},p^{ij};\Theta)} = \lambda_1 \mathcal{L}_1(y^i,p^i) + \lambda_2 \mathcal{L}_2(y^j,p^j) + \lambda_3 \mathcal{L}_{proxy}(y^{ij},p^{ij}),$$

where $\lambda_1$, $\lambda_2$, and $\lambda_3$ are manually set hyperparameters, and are used for balancing the contributions of the losses of various parts to the general loss. For $\mathcal{L}_1(y^i, p^i)$, $\mathcal{L}_2(y^j, p^j)$ and $(y^{ij}, p^{ij})$. For details, reference may be made to the foregoing embodiments. Details for this example are described with respect to other embodiments.

After the preset image segmentation model has been converged by using a Dice loss function, training is completed once. The rest is deduced by analogy. After a plurality of times of training, the trained image segmentation model can be obtained.

During training, in addition to that an actual annotation of "liver" in a slice sample may be used to verify a segmentation prediction value, the true value of the correlation relationship between the slice samples may be used to verify the relationship (that is, a predicted correlation relationship) between the two segmentation prediction values. Therefore, the effect of further "supervision" can be achieved. That is, the accuracy of segmentation by the trained image segmentation model can be further improved.

The part "configured to determine the correlation relationship between the slice samples" in the image segmentation model can use information (that is, the correlation relationship between the slice samples) other than the annotated information of the target object by the slice sample to train the image segmentation model during training, to learn a priori knowledge (which is knowledge that can be used by a machine learning algorithm) of shape. Therefore, the part "configured to determine the correlation relationship between the slice samples" may also be referred to as a proxy supervision part. Details for this example are described with respect to other embodiments.

(II) The to-be-Segmented Medical Image May be Segmented by Using the Trained Image Segmentation Model.

The trained image segmentation model includes a residual network, a segmentation network, and a fusion network. The residual network may include a first residual network branch and a second residual network branch. The segmentation network includes a first segmentation network branch and a second segmentation network branch.

Figure 11:
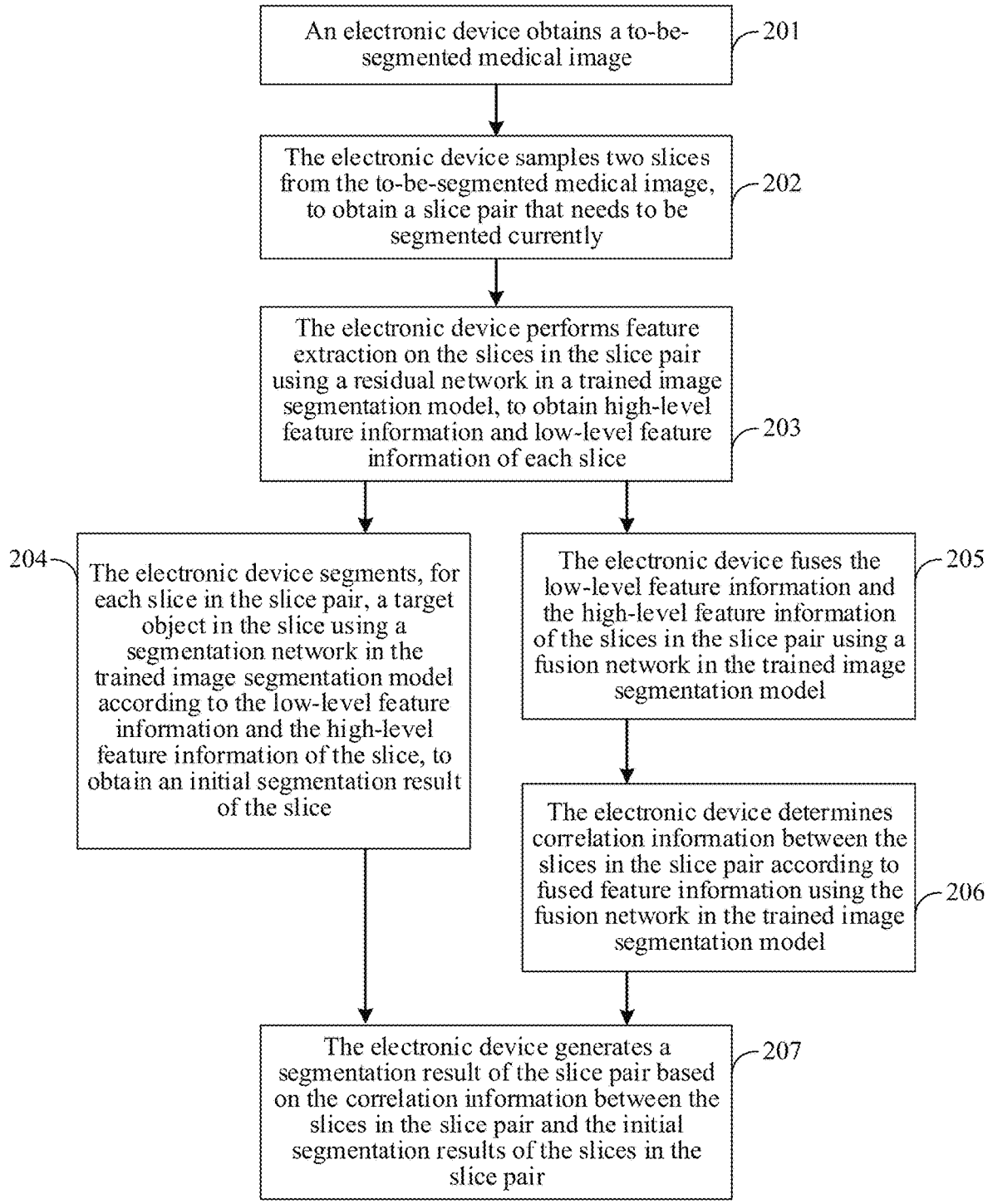
FIG. 11 is another flowchart of a method for segmenting a medical image according to an embodiment of this disclosure.

As shown in FIG. 11, a specific procedure of the method for segmenting a medical image may be as follows:

201. An electronic device obtains a to-be-segmented medical image.

For example, the electronic device may receive medical images transmitted by each medical image acquisition device such as a MRI scanner or a CT scanner after the medical image acquisition device performs image acquisition on the human liver position and use these medical images as to-be-segmented medical images.

Preprocessing, for example, an operation such as deduplication, cropping, rotation, and/or flipping may be performed on the received medical images.

202. The electronic device samples two slices from the to-be-segmented medical image, to obtain a slice pair that needs to be segmented currently.

For example, the electronic device may consecutively sample two slices in a z-axis direction according to a particular time interval, to form a slice pair, or may randomly sample two slices in a z-axis direction according to a particular time interval, to form a slice pair.

To provide a sufficient receptive field, during slice sampling, may be performed by using a patch with an overlapping part (patch-wise) as a unit for sampling.

A patch is a basic unit of an image. An image has various types of basic units. In addition to a patch-wise manner, a pixel-wise manner, an image-wise manner, or the like may be used. The pixel-wise manner is a pixel level, that is, commonly referred to as "pixel". The image-wise is an image level (that is, an image is used as a unit). The patch-wise manner refers to a region between a pixel level and an image level. Each patch is formed of a plurality of pixels.

Figure 12:
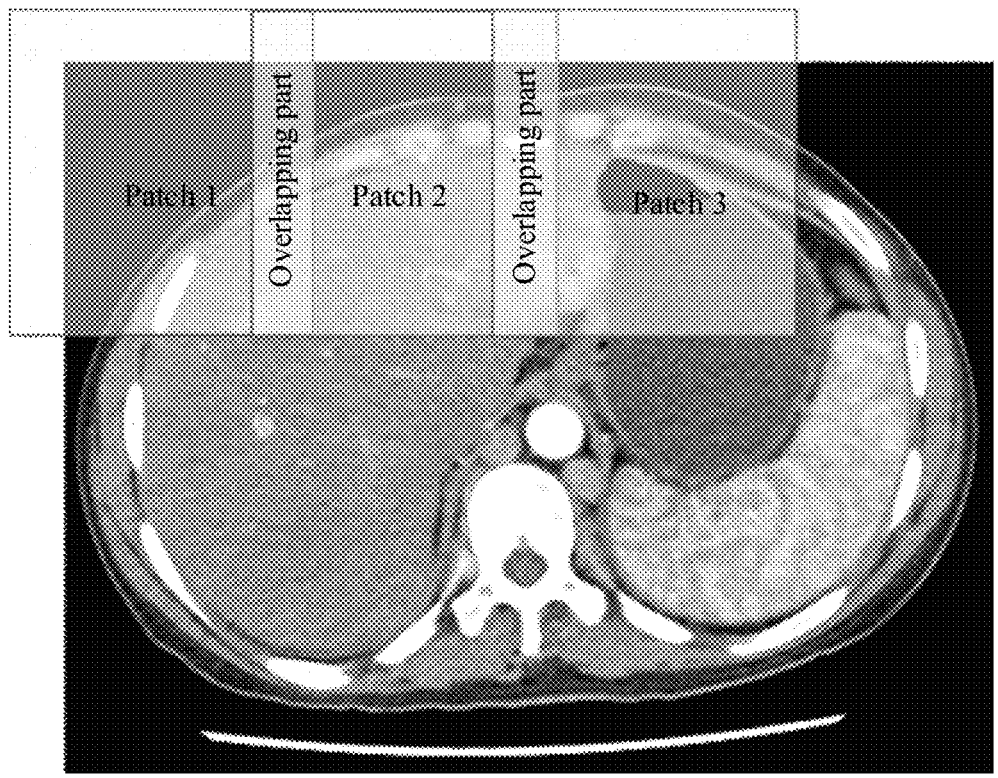
FIG. 12 is an exemplary diagram of an overlapping patch in a method for segmenting a medical image according to an embodiment of this disclosure.

For example, as shown in FIG. 12, during slice sampling, a patch may be used as a unit to perform sampling patch by patch. A currently sampled patch and a previous patch have a partial overlapping region. For example, a patch 2 and a patch 1 have an overlapping region, and the patch 3 and the patch 2 also have an overlapping region. The size of an overlapping region may be set according to requirements of actual disclosures.

In addition, two slices sampled into the slice pair may not overlap or may partially overlap or may completely overlap (that is, the same slice). It is to be understood that in the trained image segmentation model, the same network structures in different branches may have different parameters (for example, parameters in ASPP in different branches is not shared). Therefore, for the same input, initial segmentation results outputted by different branches may be different. Therefore, the input of two identical slices is still significant.

203. The electronic device performs feature extraction on the slices in the slice pair by using a residual network in a trained image segmentation model, to obtain high-level feature information and low-level feature information of each slice.

For example, as shown in FIG. 8, the slice pair includes a first slice and a second slice. In this case, step 203 may be specifically as follows:

The electronic device performs feature extraction on the first slice by using the first residual network branch 803 such as ResNet-18 in the residual network, to obtain high-level feature information in different dimensions and low-level feature information 806 in different dimensions corresponding to the first slice 801, and then processes the high-level feature information corresponding to the first slice 801 by using the ASPP 812, to obtain high-level feature information 808 in a plurality of dimensions corresponding to the first slice 801.

In addition, the electronic device performs feature extraction on the second slice 802 by using the second residual network branch 804 such as another ResNet-18 in the residual network, to obtain high-level feature information in different dimensions and low-level feature information 807 in different dimensions corresponding to the second slice 802, and then processes the high-level feature information corresponding to the second slice 802 by using another ASPP 813, to obtain high-level feature information 809 in a plurality of dimensions corresponding to the second slice 802.

The first residual network branch 803 and the second residual network branch 804 may share parameters, and parameters of ASPP connected to the two branches may not be shared. Specific parameters of the ASPP may be determined according to requirements of actual applications. Details for this example are described with respect to other embodiments.

204. The electronic device segments, for each slice in the slice pair, a target object in the slice by using a segmentation network in the trained image segmentation model according to the low-level feature information and the high-level feature information of the slice, to obtain an initial segmentation result of the slice.

For example, still, the slice pair includes a first slice and a second slice. In this case, as shown in FIG. 8, step 204 may be specifically as follows:

The electronic device performs convolution with a convolution kernel of "1×1" on the low-level feature information 806 and the high-level feature information 808 of the first slice 801 by using the first segmentation network branch 803, upsamples the high-level feature information obtained after convolution to have the same size as the low-level feature information obtained after convolution, concatenates the upsampled high-level feature information and low-level feature information obtained after convolution, to obtain the concatenated feature information of the first slice 801, then performs convolution with a convolution kernel of "3×3" on the concatenated feature information, and then upsamples the concatenated feature information obtained after convolution to obtain a size of the first slice, so that the initial segmentation result 814 of the first slice 801 can be obtained.

Similarly, similar operations may be performed in the other branch. That is, the electronic device performs convolution with a convolution kernel of "1×1" on the low-level feature information 807 of the second slice 802 and the high-level feature information 809 of the second slice 802 by using the second segmentation network branch 804, upsamples the high-level feature information obtained after convolution to have the same size as the low-level feature information obtained after convolution, concatenates the upsampled high-level feature information and low-level feature information obtained after convolution, to obtain the concatenated feature information of the second slice 802, then performs convolution with a convolution kernel of "3×3" on the concatenated feature information, and then upsamples the concatenated feature information obtained after convolution to obtain a size of the second slice 802, so that the initial segmentation result 815 of the second slice 802 may be obtained.

205. The electronic device fuses the low-level feature information and the high-level feature information of the slices in the slice pair by using a fusion network in the trained image segmentation model. For example, as shown in FIG. 8, details may be as follows:

In an aspect, element-by-element summation is performed on the low-level feature information 806 of the first slice 801 and the low-level feature information 807 of the second slice 802, to obtain fused low-level feature information. In another aspect, element-by-element summation is performed on the high-level feature information 808 of the first slice 801 and the high-level feature information 809 of the second slice 802, to obtain the fused high-level feature information. The fused low-level feature information and the fused high-level feature information are then processed by using the channel attention module 810 in the fusion network in the trained segmentation model, to obtain the processed feature information. Further, element-by-element summation is performed on the processed feature information and the fused high-level feature information, so that the fused feature information can be obtained.

Steps 204 and 205 may be performed in different orders.

206. The electronic device determines correlation information between the slices in the slice pair according to fused feature information by using the fusion network in the trained image segmentation model.

For example, the electronic device may specifically select features belonging to a liver region from the fused feature information, separately determine the foreground region (that is, the region in which liver is located) in the first slice and the foreground region (that is, the region in which liver is located) in the second slice according to the selected features, and use the remaining region other than the union of the foreground regions of the two slices in the first slice as the background region of the slice pair. A pixel only belonging to the foreground region of any one slice of the two slices in the fused feature information is then used as a difference pixel of the slice pair, and a pixel belonging to both slices in the fused feature information is used as an intersection pixel. Subsequently, pixel type identification is performed on the background regions, the difference pixel, and the intersection pixel of the slice pair. For example, different pixel values are used to identify these regions, or different colors are used to identify these regions, so that the correlation information between the first slice and the second slice may be obtained.

The operation of determining correlation information between the slices in the slice pair according to fused feature information may be implemented by using a plurality of network structures. For example, as shown in FIG. 8, specifically, convolution is performed on the fused feature information by using a convolution layer with a convolution kernel of 3×3, and the fused feature information obtained after convolution is then upsampled to have the same size as inputted slices (the first slice 801 and the second slice 802), so that the correlation information 811 between the first slice 801 and the second slice 802, for example, the background region of the slice pair, the intersection pixel of the first slice 801 and the second slice 802, and the difference pixel of the first slice 801 and the second slice 802, may be obtained.

207. The electronic device generates a segmentation result of the slice pair based on the correlation information between the slices in the slice pair and the initial segmentation results of the slices in the slice pair.

For example, still, the slice pair includes a first slice and a second slice. In this case, a segmentation result of the second slice may be predicted according to the correlation information between the slices and an initial segmentation result of the first slice, to obtain the predicted segmentation result of the second slice, and a segmentation result of the first slice is predicted according to the correlation information between the slices and an initial segmentation result of the second slice, to obtain the predicted segmentation result of the first slice. The predicted segmentation result of the first slice and the initial segmentation result of the first slice are then averaged, to obtain the adjusted segmentation result of the first slice, and the predicted segmentation result of the second slice and the initial segmentation result of the second slice are averaged, to obtain the adjusted segmentation result of the second slice. Further, the adjusted segmentation result of the first slice and the adjusted segmentation result of the second slice are fused, for example, averaged. An averaged result is binarized, so that the segmentation result of the slice pair can be obtained.

Subsequently, the electronic device may return to perform step 202, to sample two other slices from the to-be-segmented medical image for use as a slice pair that needs to be segmented currently, and the slice pair is processed in the manner of steps 203 to 207, to obtain a segmentation result corresponding to the slice pair. The rest is deduced by analogy, to obtain segmentation results of all the slice pairs in the to-be-segmented medical image, and the segmentation results of these slice pairs are combined in an order of the slices, so that a segmentation result (that is, a 3D segmentation result) of the to-be-segmented medical image can be obtained.

As can be learned from above, in this embodiment, an image segmentation model may be trained in advance by using a slice sample pair and a correlation relationship (a priori knowledge or the like information) between slice samples in the slice sample pair. After a to-be-segmented medical image is obtained, the image segmentation model may then be used to perform feature extraction on slice pairs in the to-be-segmented medical image by using different receptive fields, to obtain high-level feature information and low-level feature information of the each slice in the slice pair. In an aspect, for each slice in the slice pair, a liver region in the slice is then segmented according to the low-level feature information and the high-level feature information of the slice, to obtain an initial segmentation result of the slice. In another aspect, the low-level feature information and the high-level feature information of the slices in the slice pair are fused, and correlation information between the slices is determined according to fused feature information. The initial segmentation results of the slices in the slice pair are then adjusted by using the obtained correlation information, to obtain an eventually required segmentation result. During training, while annotated information in a single slice is considered, other a priori knowledge, for example, information such as a correlation relationship between slices, is also used as one type of learning data, to implement a supervision effect on the accuracy of slice segmentation. Therefore, the accuracy of segmentation of the image segmentation model can be improved. In addition, with the introduction of the fusion network, model overfitting caused by shape changes of segmentation objects in training samples when there are a small number of training samples can be avoided.

In addition, during the use of a trained image segmentation model, in consideration that slices of a 3D medical image are correlated, two slices (the slice pair) may be segmented at the same time by using the trained image segmentation model, and a segmentation result is further adjusted by using a correlation relationship between the slices, so that it is ensured that shape information of a target object (for example, liver) can be captured more accurately, to achieve higher segmentation accuracy.

To better implement the foregoing method, an embodiment of this disclosure further provides an apparatus for segmenting a medical image. The apparatus for segmenting a medical image may be integrated in an electronic device, for example, a device such as a server or terminal. The terminal may include a tablet computer, a notebook computer, a PC, a medical image acquisition device, an electronic medical care device, or the like.

Figure 13:
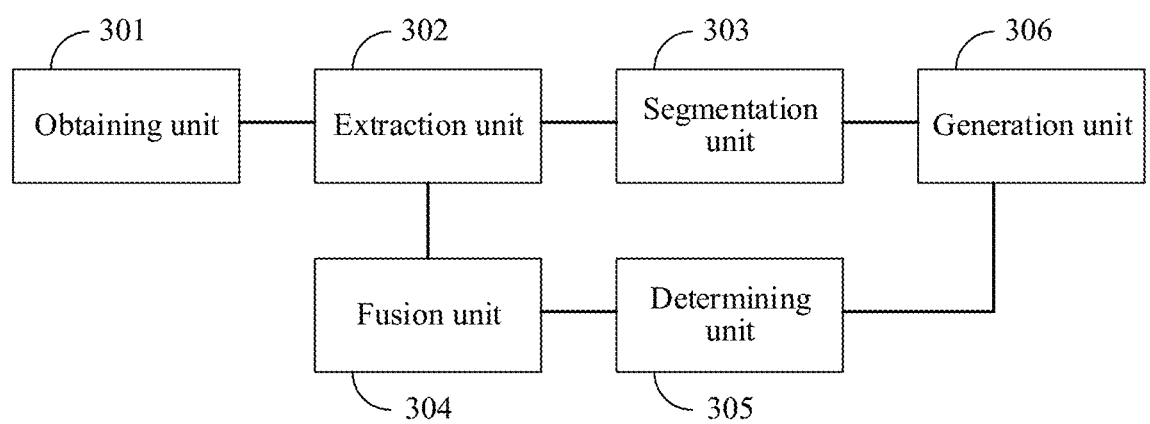
FIG. 13 is a schematic structural diagram of an apparatus for segmenting a medical image according to an embodiment of this disclosure.

For example, as shown in FIG. 13, the apparatus for segmenting a medical image may include an obtaining unit 301, an extraction unit 302, a segmentation unit 303, a fusion unit 304, a determining unit 305, a generation unit 306, or the like as follows:

(1) Obtaining Unit 301

The obtaining unit 301 is configured to obtain a slice pair, the slice pair including two slices obtained through sampling of a to-be-segmented medical image.

For example, the obtaining unit 301 may be specifically configured to: obtain the to-be-segmented medical image, and sample two slices from the to-be-segmented medical image, to form the slice pair.

The to-be-segmented medical image may be provided to the obtaining unit 301 after each medical image acquisition device such as an MM scanner or a CT scanner performs image acquisition on biological tissue such as heart or liver.

(2) Extraction Unit 302

The extraction unit 302 is configured to perform feature extraction on each slice in the slice pair by using different receptive fields, to obtain high-level feature information and low-level feature information of the each slice.

There may be a plurality of manners of performing feature extraction on the slice by using different receptive fields. For example, feature extraction may be implemented by using a residual network.

The extraction unit 302 may be specifically configured to perform the feature extraction on the each slice in the slice pair by using a residual network in a trained segmentation model, to obtain the high-level feature information and the low-level feature information of the each slice.

For example, the slice pair includes a first slice and a second slice, and the residual network includes a first residual network branch and a second residual network branch that are parallel and have the same structure. In this case, the extraction unit 302 may perform feature extraction on the first slice by using the first residual network branch in the residual network, to obtain high-level feature information in different dimensions and low-level feature information in different dimensions corresponding to the first slice; and perform feature extraction on the second slice by using the second residual network branch in the residual network, to obtain high-level feature information in different dimensions and low-level feature information in different dimensions corresponding to the second slice.

The network structure of the first residual network branch and the second residual network branch may be specifically determined according to requirements of actual applications. For example, ResNet-18 may be used. In addition, the first residual network branch and the second residual network branch may share parameters. Specific parameter settings may be determined according to requirements of actual applications.

To obtain the high-level feature information in more dimensions, SPP processing such as ASPP processing may be further performed on the obtained high-level feature information. For details, reference may be made to the foregoing method embodiments. Details for this example are described with respect to other embodiments.

(3) Segmentation Unit 303

The segmentation unit 303 is configured to segment, for each slice in the slice pair, a target object in the slice according to the low-level feature information and the high-level feature information of the slice, to obtain an initial segmentation result of the slice.

For example, the segmentation unit 303 may be specifically configured to segment, for the each slice in the slice pair, the target object in the slice by using a segmentation network in the trained segmentation model according to the low-level feature information and the high-level feature information of the slice, to obtain the initial segmentation result of the slice, for example, is specifically configured to: perform, for each slice in the slice pair, convolution separately on the low-level feature information and the high-level feature information of the slice by using the segmentation network in the trained segmentation model; upsample the high-level feature information obtained after convolution to have the same size as the low-level feature information obtained after convolution, and concatenate the upsampled high-level feature information and low-level feature information obtained after convolution, to obtain concatenated feature information; and select a pixel belonging to the target object in the slice according to the concatenated feature information, to obtain the initial segmentation result of the slice. For details, reference may be made to the foregoing method embodiments. Details for this example are described with respect to other embodiments.

(4) Fusion Unit 304

The fusion unit 304 is configured to fuse the low-level feature information and the high-level feature information of the slices in the slice pair.

For example, the fusion unit 304 may be specifically configured to fuse the low-level feature information and the high-level feature information of the slices in the slice pair by using a fusion network in the trained segmentation model.

There may be a plurality of methods for fusing the low-level feature information and the high-level feature information. For example, the low-level feature information and the high-level feature information may be fused in a manner of "element-by-element summation (Sum)" or channel superimposition. When "element-by-element summation" is used as an example, the fusion unit 304 may be specifically configured to:

perform element-by-element summation on the low-level feature information of the slices in the slice pair, to obtain fused low-level feature information; perform element-by-element summation on the high-level feature information of the slices in the slice pair, to obtain fused high-level feature information; and fuse the fused low-level feature information and the fused high-level feature information by using the fusion network in the trained segmentation model, to obtain the fused feature information.

There may be a plurality of manners of fusing the fused low-level feature information and the fused high-level feature information. The manners may be, for example, as follows:

The fusion unit 304 may be specifically configured to perform element-by-element summation on the fused low-level feature information and the fused high-level feature information, to obtain the fused feature information by using the fusion network in the trained segmentation model.

Because different features have different effects in a specific task, to make better use of the features to improve the accuracy of image segmentation, an attention mechanism may further be used to enable the network to automatically assign different weights to different feature information, so that the network can selectively fuse feature information.

The fusion unit 304 may be specifically configured to: assign a weight to the fused low-level feature information according to the fused low-level feature information and the fused high-level feature information by using a channel attention module in the fusion network in the trained segmentation model, to obtain weighted feature information; perform element-by-element multiplication on the weighted feature information and the fused low-level feature information, to obtain processed feature information; and perform element-by-element summation on the processed feature information and the fused high-level feature information, to obtain the fused feature information.

The structure of the channel attention module may be specifically determined according to requirements of actual applications. Details for this example are described with respect to other embodiments.

(5) Determining Unit 305

The determining unit 305 is configured to determine correlation information between the slices in the slice pair according to the fused feature information.

The target object is an object that needs to be recognized from a slice, for example, "liver" in the segmentation of a liver image, "heart" in the segmentation of a heart image, or the like.

For example, the determining unit 305 may include a selection subunit and a determining subunit as follows:

The selection subunit may be configured to select a feature belonging to the target object from the fused feature information.

The determining subunit may be configured to determine correlation information between slices according to the selected feature. For example, details may be specifically as follows:

The determining subunit may be specifically configured to: determine a background region and a foreground region of each slice in the slice pair according to the selected feature, calculate a difference pixel and an intersection pixel between the foreground regions of the slices, and generate the correlation information between the slices in the slice pair according to the background region, the difference pixel, and the intersection pixel.

For example, the determining subunit may be specifically configured to: in the fused feature information, use a pixel only belonging to the foreground region of any one slice in the slice pair as the difference pixel; and in the fused feature information, use a pixel belonging to both the foreground regions of the two slices in the slice pair as the intersection pixel.

In another example, the determining subunit is specifically configured to perform pixel type identification on the background region, the difference pixel, and the intersection pixel, to obtain the correlation information between the slices. For details, reference may be made to the foregoing method embodiments. Details for this example are described with respect to other embodiments.

(6) Generation Unit 306

The generation unit 306 is configured to generate a segmentation result of the slice pair based on the correlation information and the initial segmentation results of the slices in the slice pair.

For example, the slice pair includes a first slice and a second slice is used as an example. In this case, the generation unit 306 may be specifically configured to:

predict a segmentation result of the second slice according to the correlation information and an initial segmentation result of the first slice, to obtain the predicted segmentation result of the second slice; predict a segmentation result of the first slice according to the correlation information and an initial segmentation result of the second slice, to obtain the predicted segmentation result of the first slice; adjust the initial segmentation result of the first slice based on the predicted segmentation result of the first slice, to obtain the adjusted segmentation result of the first slice; adjust the initial segmentation result of the second slice based on the predicted segmentation result of the second slice, to obtain the adjusted segmentation result of the second slice; and fuse the adjusted segmentation result of the first slice and the adjusted segmentation result of the second slice, to obtain the segmentation result of the slice pair.

For example, the generation unit 306 may be specifically configured to: average the predicted segmentation result of the first slice and the initial segmentation result of the first slice, to obtain the adjusted segmentation result of the first slice; and average the predicted segmentation result of the second slice and the initial segmentation result of the second slice, to obtain the adjusted segmentation result of the second slice.

In another example, the generation unit 306 may be specifically configured to: average the adjusted segmentation result of the first slice and the adjusted segmentation result of the second slice, and binarize an averaged result, to obtain the segmentation result of the slice pair.

Figure 14:
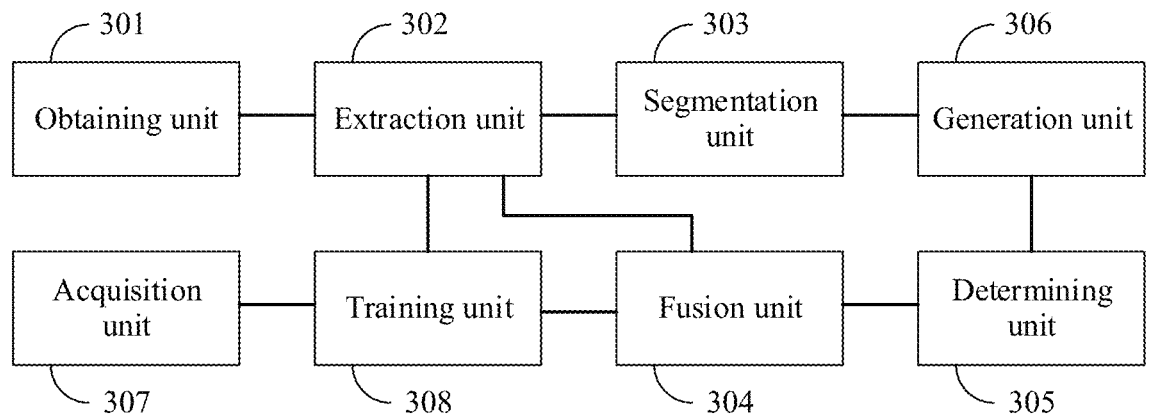
FIG. 14 is another schematic structural diagram of an apparatus for segmenting a medical image according to an embodiment of this disclosure.

The trained image segmentation model may be trained by using a plurality of slice sample pairs annotated with true values. Specifically, the trained image segmentation model may be preset by operations personnel or may be trained by the apparatus for segmenting a medical image. That is, as shown in FIG. 14, the apparatus for segmenting a medical image may further include an acquisition unit 307 and a training unit 308.

The acquisition unit 307 may be configured to acquire a plurality of slice sample pairs annotated with true values.

The slice sample pair includes two slice samples obtained through sampling of a medical image sample. For details, reference may be made to the foregoing embodiments. Details for this example are described with respect to other embodiments.

The training unit 308 may be configured to: perform feature extraction on each slice sample in the slice sample pair by using a residual network in a preset segmentation model, to obtain high-level feature information and low-level feature information of the each slice sample; segment, for each slice sample in the slice sample pair, a target object in the slice sample by using a segmentation network in the preset segmentation model according to the low-level feature information and the high-level feature information of the slice sample, to obtain a predicted segmentation value of the slice sample; fuse the low-level feature information and the high-level feature information of the slice samples in the slice sample pair by using a fusion network in the preset segmentation model, and predict the correlation information between the slice samples in the slice sample pair according to the fused feature information; and converge the preset segmentation model according to the true values, the predicted segmentation values of the slice samples in the slice sample pair, and the predicted correlation information, to obtain the trained segmentation model.

For example, the training unit 308 may be specifically configured to converge the segmentation model according to the true values, the predicted segmentation values of the slice samples in the slice sample pair, and the predicted correlation information by using a Dice loss function, to obtain the trained segmentation model.

For the details of the Dice loss function, reference may be made to the foregoing method embodiments. Details for this example are described with respect to other embodiments.

During specific implementation, the foregoing units may be implemented as independent entities, or may be combined, or may be implemented as the same entity or several entities. For specific implementation of the foregoing units, refer to the foregoing method embodiments. Details for this example are described with respect to other embodiments.

As can be learned from above, in this embodiment, after a slice pair is obtained, the extraction unit 302 may separately perform feature extraction on slices in the slice pair by using different receptive fields, to obtain high-level feature information and low-level feature information of the each slice. In an aspect, the segmentation unit 303 then segments, for each slice in the slice pair, a target object in the slice according to the low-level feature information and the high-level feature information of the slice, to obtain an initial segmentation result of the slice. In another aspect, the fusion unit 304 fuses the low-level feature information and the high-level feature information of the slices in the slice pair, and the determining unit 305 determines correlation information between the slices in the slice pair according to fused feature information. Further, the generation unit 306 generates a segmentation result of the slice pair based on the correlation information between the slices in the slice pair and the initial segmentation results of the slices in the slice pair. In consideration that slices of a 3D medical image are correlated, the apparatus provided in the embodiments of this disclosure segments two slices (the slice pair) at the same time, and further adjusts a segmentation result by using a correlation relationship between the slices, so that it is ensured that shape information of a target object (for example, liver) can be captured more accurately, to achieve higher segmentation accuracy.

Figure 15:
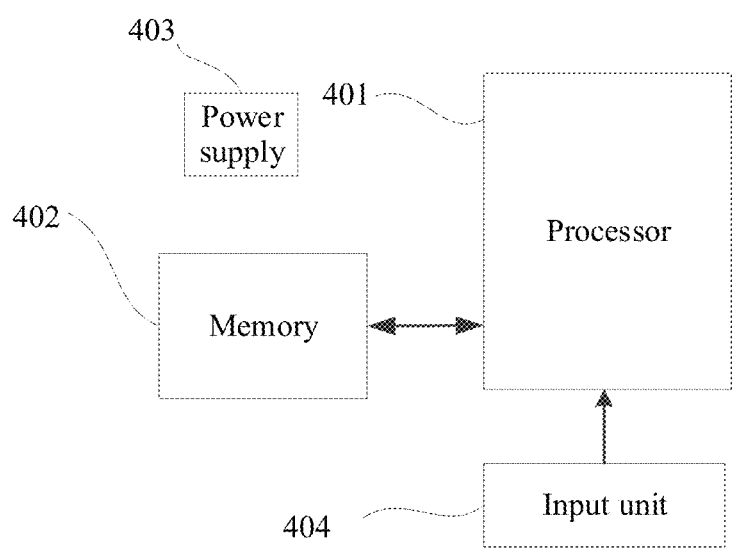
FIG. 15 is a schematic structural diagram of an electronic device according to an embodiment of this disclosure.

An embodiment of this disclosure further provides an electronic device. FIG. 15 is a schematic structural diagram of an electronic device according to an embodiment of this disclosure.

Specifically, the electronic device may include components such as a processor 401 with one or more processing cores, a memory 402 with one or more computer-readable storage media, a power supply 403, and an input unit 404. A person skilled in the art may understand that the electronic device structure shown in FIG. 15 does not constitute a limitation to the electronic device. The electronic device may include more or fewer component than those shown in the figure, may combine some component, or may have different component arrangements. Here:

The processor 401 is a control center of the electronic device, and connects various parts of the entire electronic device by using various interfaces and lines. By running or executing a software program and/or a module stored in the memory 402, and invoking data stored in the memory 402, the processor performs various functions of the electronic device and processes data, thereby performing overall monitoring on the electronic device. The processor 401 may include one or more processing cores. Preferably, the processor 401 may integrate an application processor and a modem, where the application processor mainly processes an operating system, a user interface, and an application program and the like, and the modem mainly processes wireless communication. It may be understood that the foregoing modem processor may not be integrated into the processor 401.

The memory 402 may be configured to store the software programs and modules. The processor 401 runs the software programs and modules stored in the memory 402, to perform various function application and data processing. The memory 402 may mainly include a program storage area and a data storage area. The program storage area may store an operating system, an application program required by at least one function (such as a sound playing function and an image display function), and the like. The data storage area may store data created according to use of the electronic device, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The electronic device further includes the power supply 403 for supplying power to the components. Preferably, the power supply 403 may logically connect to the processor 401 by using a power supply management system, thereby implementing functions, such as charging, discharging, and power consumption management, by using the power supply management system. The power supply 403 may further include one or more of a direct current or alternating current power supply, a re-charging system, a power failure detection circuit, a power supply converter or inverter, a power supply state indicator, and any other component.

The electronic device may further include the input unit 404. The input unit 404 may be configured to receive entered numeric or character information and generate keyboard, mouse, joystick, optical, or trackball signal input related to user settings and function control.

Although not shown in the figure, the electronic device may further include a display unit, and the like. Details for this example are described with respect to other embodiments. Specifically, in this embodiment, the processor 401 of the electronic device may load, according to the following instructions, executable files corresponding to processes of one or more application programs into the memory 402. The processor 401 runs the application programs stored in the memory 402, to implement the various functions as follows:

obtaining a slice pair, the slice pair including two slices by sampling a to-be-segmented medical image;

performing feature extraction on each slice in the slice pair by using different receptive fields, to obtain high-level feature information and low-level feature information of the each slice;

segmenting, for each slice in the slice pair, a target object in the slice according to the low-level feature information and the high-level feature information of the slice, to obtain an initial segmentation result of the slice;

fusing the low-level feature information and the high-level feature information of the slices in the slice pair, and determining correlation information between the slices in the slice pair according to fused feature information; and generating a segmentation result of the slice pair based on the correlation information and the initial segmentation results of the slices in the slice pair.

For example, feature extraction may be specifically performed on each slice in the slice pair by using a residual network in a trained segmentation model, to obtain the high-level feature information and the low-level feature information of the each slice; for the each slice in the slice pair, the target object in the slice is then segmented by using a segmentation network in the trained segmentation model according to the low-level feature information and the high-level feature information of the slice, to obtain the initial segmentation result of the slice; and the low-level feature information and the high-level feature information of the slices in the slice pair are fused by using a fusion network in the trained segmentation model, and correlation information between the slices in the slice pair is determined according to fused feature information, a segmentation result of the slice pair is then generated based on the correlation information and the initial segmentation results of the slices in the slice pair.

The trained segmentation model may be trained by using a plurality of slice sample pairs annotated with true values. Specifically, the trained segmentation model may be preset by operations personnel or may be trained by the apparatus for segmenting a medical image. That is, the processor 401 may further run the application program stored in the memory 402, to implement the following functions:

acquiring a plurality of slice sample pairs annotated with true values;

performing feature extraction on each slice sample in the slice sample pair by using a residual network in a preset segmentation model, to obtain high-level feature information and low-level feature information of the each slice sample;

segmenting, for each slice sample in the slice sample pair, a target object in the slice sample by using a segmentation network in the preset segmentation model according to the low-level feature information and the high-level feature information of the slice sample, to obtain a predicted segmentation value of the slice sample;

fusing the low-level feature information and the high-level feature information of the slice samples in the slice sample pair by using a fusion network in the preset segmentation model, and predicting correlation information between the slice samples in the slice sample pair according to the fused feature information; and converging the preset segmentation model according to the true values, the predicted segmentation values of the slice samples in the slice sample pair, and the predicted correlation information, to obtain the trained segmentation model.

For the details of the foregoing operations, reference may be made to the foregoing embodiments. Details for this example are described with respect to other embodiments.

As can be learned from above, for the electronic device in this embodiment, after a slice pair is obtained, feature extraction may be performed on each slice in the slice pair by using different receptive fields, to obtain high-level feature information and low-level feature information of the each slice. In an aspect, for the each slice in the slice pair, a target object in the slice is then segmented according to the low-level feature information and the high-level feature information of the slice, to obtain an initial segmentation result of the slice. In another aspect, the low-level feature information and the high-level feature information of the slices in the slice pair are fused, and correlation information between the slices in the slice pair is determined according to fused feature information. The initial segmentation results of the slices in the slice pair are then adjusted by using the obtained correlation information, to obtain an eventually required segmentation result. In consideration that slices of a 3D medical image are correlated, in the method provided in the embodiments of this disclosure, two slices (the slice pair) are segmented at the same time, and a segmentation result is further adjusted by using a correlation relationship between the slices, so that it is ensured that shape information of a target object (for example, liver) can be captured more accurately, to achieve higher segmentation accuracy.

A person of ordinary skill in the art may understand that, all or some steps of the methods in the foregoing embodiments may be implemented by using instructions, or implemented through instructions controlling relevant hardware, and the instructions may be stored in a computer-readable medium and loaded and executed by a processor.

In view of this, an embodiment of this disclosure provides a storage medium, storing a plurality of instructions. The instructions can be loaded by a processor to perform the steps in any method for segmenting a medical image provided in the embodiments of this disclosure. For example, the instructions may be executed to perform the following steps:

obtaining a slice pair, the slice pair including two slices by sampling a to-be-segmented medical image;

performing feature extraction on each slice in the slice pair by using different receptive fields, to obtain high-level feature information and low-level feature information of the each slice;

segmenting, for each slice in the slice pair, a target object in the slice according to the low-level feature information and the high-level feature information of the slice, to obtain an initial segmentation result of the slice;

fusing the low-level feature information and the high-level feature information of the slices in the slice pair, and determining correlation information between the slices in the slice pair according to fused feature information;

generating a segmentation result of the slice pair based on the correlation information and the initial segmentation results of the slices in the slice pair.

For example, the feature extraction may be specifically performed on the each slice in the slice pair by using a residual network in a trained segmentation model, to obtain the high-level feature information and the low-level feature information of the each slice; for the each slice in the slice pair, the target object in the slice is then segmented by using a segmentation network in the trained segmentation model according to the low-level feature information and the high-level feature information of the slice, to obtain the initial segmentation result of the slice; and the low-level feature information and the high-level feature information of the slices in the slice pair are fused by using a fusion network in the trained segmentation model, and correlation information between the slices in the slice pair is determined according to fused feature information, and a segmentation result of the slice pair is then generated based on the correlation information and the initial segmentation results of the slices in the slice pair.

The trained segmentation model may be trained by using a plurality of slice sample pairs annotated with true values. Specifically, the trained segmentation model may be preset by operations personnel or may be trained by the apparatus for segmenting a medical image. That is, the instructions may further be executed to perform the following steps:

acquiring a plurality of slice sample pairs annotated with true values;

performing feature extraction on each slice sample in the slice sample pair by using a residual network in a preset segmentation model, to obtain high-level feature information and low-level feature information of the each slice sample;

segmenting, for each slice sample in the slice sample pair, a target object in the slice sample by using a segmentation network in the preset segmentation model according to the low-level feature information and the high-level feature information of the slice sample, to obtain a predicted segmentation value of the slice sample;

fusing the low-level feature information and the high-level feature information of the slice samples in the slice sample pair by using a fusion network in the preset segmentation model, and predicting correlation information between the slice samples in the slice sample pair according to the fused feature information; and converging the preset segmentation model according to the true values, the predicted segmentation values of the slice samples in the slice sample pair, and the predicted correlation information, to obtain the trained segmentation model.

For specific implementations of the above operations, refer to the foregoing embodiments. Details for this example are described with respect to other embodiments.

The storage medium may include a read-only memory (ROM), a random access memory (RAM), a magnetic disk, an optical disc, or the like.

Because the instructions stored in the storage medium may perform the steps of any method for segmenting a medical image provided in the embodiments of this disclosure, the instructions can implement beneficial effects that can be implemented by any method for segmenting a medical image provided in the embodiments of this disclosure. For details, reference may be made to the foregoing embodiments. Details for this example are described with respect to other embodiments.

The method and apparatus for segmenting a medical image, the electronic device, and the storage medium provided in the embodiments of this disclosure are described above in detail. Although the principles and implementations of the present disclosure are described by using specific examples in this specification, the foregoing descriptions of the embodiments are only intended to help understand the method and core idea of the method of the present disclosure. Meanwhile, persons of ordinary skill in the art may make modifications to the specific implementations and application range according to the idea of the present disclosure. In conclusion, the content of the specification is not to be construed as a limitation to the present disclosure.

What is claimed is:

1. A method for segmenting a medical image, performed by an electronic device, comprising:

obtaining a slice pair comprising two slices from a medical image;

performing feature extraction on each slice in the slice pair using different receptive fields, to obtain high-level feature information and low-level feature information of the each slice in the slice pair;

segmenting a target object in the each slice in the slice pair according to the low-level feature information and the high-level feature information of the each slice, to obtain an initial segmentation result of the each slice;

fusing the low-level feature information and the high-level feature information of the slices in the slice pair to obtain a fused feature information;

determining correlation information between the slices in the slice pair according to the fused feature information; and generating a segmentation result of the slice pair based on the correlation information and the initial segmentation results of the slices in the slice pair.

2. The method of claim 1, wherein the determining the correlation information between the slices in the slice pair according to the fused feature information comprises:

selecting a feature belonging to the target object from the fused feature information; and determining the correlation information between the slices in the slice pair according to the selected feature.

3. The method of claim 2, wherein the determining the correlation information between the slices in the slice pair according to the selected feature comprises:

determining a background region and a foreground region of each slice in the slice pair according to the selected feature;

calculating a difference pixel and an intersection pixel between the foreground regions of the slices in the slice pair; and generating the correlation information between the slices in the slice pair according to the background region, the difference pixel, and the intersection pixel.

4. The method of claim 3, wherein the calculating the difference pixel and the intersection pixel between the foreground regions of the slices in the slice pair comprises:

selecting, from the fused feature information, a pixel only belonging to a foreground region of a single one slice in the slice pair as the difference pixel; and selecting, from the fused feature information, a pixel belonging to both foreground regions of the two slices in the slice pair as the intersection pixel.

5. The method of claim 3, wherein the generating the correlation information between the slices in the slice pair comprises:

performing pixel type identification on the background region, the difference pixel, and the intersection pixel, to obtain the correlation information between the slices in the slice pair.

6. The method of claim 1, wherein the slice pair comprises a first slice and a second slice, and the generating the segmentation result of the slice pair comprises:

predicting a segmentation result of the second slice according to the correlation information and an initial segmentation result of the first slice, to obtain a predicted segmentation result of the second slice;

predicting a segmentation result of the first slice according to the correlation information and an initial segmentation result of the second slice, to obtain a predicted segmentation result of the first slice;

adjusting the initial segmentation result of the first slice based on the predicted segmentation result of the first slice, to obtain an adjusted segmentation result of the first slice;
adjusting the initial segmentation result of the second slice based on the predicted segmentation result of the second slice, to obtain an adjusted segmentation result of the second slice; and
fusing the adjusted segmentation result of the first slice and the adjusted segmentation result of the second slice, to obtain the segmentation result of the slice pair.

7. The method of claim 6, wherein the adjusting the initial segmentation result of the first slice based on the predicted segmentation result of the first slice to obtain the adjusted segmentation result of the first slice comprises:
averaging the predicted segmentation result of the first slice and the initial segmentation result of the first slice, to obtain the adjusted segmentation result of the first slice; and
the adjusting the initial segmentation result of the second slice based on the predicted segmentation result of the second slice to obtain the adjusted segmentation result of the second slice comprises:
averaging the predicted segmentation result of the second slice and the initial segmentation result of the second slice, to obtain the adjusted segmentation result of the second slice.

8. The method of claim 6, wherein the fusing the adjusted segmentation result of the first slice and the adjusted segmentation result of the second slice to obtain the segmentation result of the slice pair comprises:
averaging the adjusted segmentation result of the first slice and the adjusted segmentation result of the second slice to obtain an averaged result; and
binarizing the averaged result to obtain the segmentation result of the slice pair.

9. The method of claim 1, wherein the performing the feature extraction on the each slice in the slice pair to obtain high-level feature information and low-level feature information of the each slice in the slice pair comprises:
performing the feature extraction on the each slice in the slice pair using a residual network in a trained segmentation model, to obtain the high-level feature information and the low-level feature information of the each slice;
the segmenting the target object in the each slice according to the low-level feature information and the high-level feature information of the each slice to obtain the initial segmentation result of the slice comprises:
segmenting the target object in the each slice using a segmentation network in the trained segmentation model according to the low-level feature information and the high-level feature information of the each slice, to obtain the initial segmentation result of the each slice;
the fusing the low-level feature information and the high-level feature information of the slices in the slice pair comprises:
fusing the low-level feature information and the high-level feature information of the slices in the slice pair using a fusion network in the trained segmentation model; and
the determining the correlation information between the slices in the slice pair according to the fused feature information comprises:
determining the correlation information between the slices in the slice pair according to the fused feature information.

10. The method of claim 9, wherein the fusing the low-level feature information and the high-level feature information of the slices in the slice pair using a fusion network in the trained segmentation model comprises:
performing element-by-element summation on the low-level feature information of the slices in the slice pair, to obtain fused low-level feature information;
performing element-by-element summation on the high-level feature information of the slices in the slice pair, to obtain fused high-level feature information; and
fusing the fused low-level feature information and the fused high-level feature information using the fusion network in the trained segmentation model, to obtain the fused feature information.

11. The method of claim 10, wherein the fusing the fused low-level feature information and the fused high-level feature information using the fusion network in the trained segmentation model, to obtain the fused feature information comprises:
performing element-by-element summation on the fused low-level feature information and the fused high-level feature information, to obtain the fused feature information using the fusion network in the trained segmentation model.

12. The method of claim 9, wherein the segmenting the target object in the each slice using a segmentation network in the trained segmentation model according to the low-level feature information and the high-level feature information of the each slice to obtain the initial segmentation result of the each slice comprises:
performing convolution separately on the low-level feature information and the high-level feature information of the each slice in the slice pair using the segmentation network in the trained segmentation model;
upsampling the high-level feature information obtained after convolution to have a same size as the low-level feature information obtained after convolution;
concatenating the upsampled high-level feature information and the low-level feature information obtained after convolution, to obtain concatenated feature information; and
selecting a pixel belonging to the target object in the each slice according to the concatenated feature information, to obtain the initial segmentation result of the each slice.

13. The method of claim 9, wherein before the performing the feature extraction on the each slice in the slice pair to obtain the high-level feature information and the low-level feature information of the each slice, the method further comprises:
acquiring a plurality of slice sample pairs annotated with true values, the slice sample pair comprising two slice samples obtained by sampling a medical image sample;
performing feature extraction on each slice sample in the slice sample pair using a residual network in a preset segmentation model, to obtain high-level feature information and low-level feature information of the each slice sample;
segmenting, for each slice sample in the slice sample pair, a target object in the slice sample using a segmentation network in the preset segmentation model according to the low-level feature information and the high-level feature information of the slice sample, to obtain a predicted segmentation value of the slice sample;

fusing the low-level feature information and the high-level feature information of the slice samples in the slice sample pair using a fusion network in the preset segmentation model, and predicting correlation information between the slice samples in the slice sample pair according to the fused feature information; and converging the preset segmentation model according to the true values, the predicted segmentation values of the slice samples in the slice sample pair, and the predicted correlation information, to obtain the trained segmentation model.

14. An apparatus for segmenting a medical image, comprising:
a memory operable to store computer-readable instructions; and
a processor operable to read the computer-readable instructions, the processor when executing the computer-readable instructions is configured to:
obtain a slice pair comprising two slices from a medical image;
perform feature extraction on each slice in the slice pair, using different receptive fields, to obtain high-level feature information and low-level feature information of the each slice in the slice pair;
segment a target object in the each slice in the slice pair according to the low-level feature information and the high-level feature information of the each slice, to obtain an initial segmentation result of the each slice;
fuse the low-level feature information and the high-level feature information of the slices in the slice pair to obtain a fused feature information;
determine correlation information between the slices in the slice pair according to the fused feature information; and
generate a segmentation result of the slice pair based on the correlation information and the initial segmentation results of the slices in the slice pair.

15. The apparatus of claim 14, wherein the processor is configured to:
select a feature belonging to the target object from the fused feature information; and
determine the correlation information between the slices in the slice pair according to the selected feature.

16. The apparatus of claim 15, wherein the processor is configured to:

determine a background region and a foreground region of each slice in the slice pair according to the selected feature;
calculate a difference pixel and an intersection pixel between the foreground regions of the slices in the slice pair; and
generate the correlation information between the slices in the slice pair according to the background region, the difference pixel, and the intersection pixel.

17. The apparatus of claim 16, wherein the processor is configured to:
select, from the fused feature information, a pixel only belonging to a foreground region of a single one slice in the slice pair as the difference pixel; and
select, from the fused feature information, a pixel belonging to both foreground regions of the two slices in the slice pair as the intersection pixel.

18. The apparatus of claim 16, wherein the processor is configured to:
perform pixel type identification on the background region, the difference pixel, and the intersection pixel, to obtain the correlation information between the slices in the slice pair.

19. A non-transitory computer-readable storage medium, having processor executable instructions stored thereon for causing a processor to:
obtain a slice pair comprising two slices from a medical image;
perform feature extraction on each slice in the slice pair, using different receptive fields, to obtain high-level feature information and low-level feature information of the each slice in the slice pair;
segment a target object in the each slice in the slice pair according to the low-level feature information and the high-level feature information of the each slice, to obtain an initial segmentation result of the each slice;
fuse the low-level feature information and the high-level feature information of the slices in the slice pair to obtain a fused feature information;
determine correlation information between the slices in the slice pair according to the fused feature information; and
generate a segmentation result of the slice pair based on the correlation information and the initial segmentation results of the slices in the slice pair.

* * * * *